United States Patent
Krishnamurthy et al.

(10) Patent No.: US 6,571,269 B1
(45) Date of Patent: May 27, 2003

(54) NOISE-TOLERANT DIGITAL ADDER CIRCUIT AND METHOD

(75) Inventors: Ram K. Krishnamurthy, Beaverton, OR (US); Jay R. Anderson, Frewsburg, NY (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,422

(22) Filed: Dec. 30, 1999

(51) Int. Cl.[7] ................................................ G06F 7/50
(52) U.S. Cl. ........................................ 708/710; 708/704
(58) Field of Search .................................. 708/710, 704, 708/706

(56) References Cited

U.S. PATENT DOCUMENTS

| | | | | |
|---|---|---|---|---|
| 5,327,369 A | * | 7/1994 | Ashkenazi | 708/274 |
| 5,483,181 A | | 1/1996 | D'Souza | 326/98 |
| 5,905,667 A | * | 5/1999 | Lee | 708/700 |
| 6,205,463 B1 | * | 3/2001 | Manglore et al. | 708/710 |
| 6,269,386 B1 | * | 7/2001 | Siers et al. | 708/710 |

OTHER PUBLICATIONS

Larsson, P., et al., "Noise in Digital Dynamic CMOS Circuits", *IEEE Journal of Solid–State Circuits*, 29, 655–662, (Jun. 1994).

Shepard, K.L., et al., "Noise in Deep Submicron Digital Design", *IEEE*, 524–531, (1996).

Rabaey, J.M., "Designing Arithmetric Building Blocks", In: *Digital Intergrated Circuits, A Design Perspective*, Prentice Hall Electronics and VLSI Series, 383–437, (1996).

Weste, N.H., et al., "Subsystem Design", In: *Principles of CMOS VLSI Design, A Systems Perspective, 2nd Edition*, Addison–Wesley Publishing Company, 513–537, (1993).

* cited by examiner

Primary Examiner—David H. Malzahn
(74) Attorney, Agent, or Firm—Schwegman, Lundberg, Woessner & Kluth, P.A.

(57) ABSTRACT

A digital adder circuit is implemented using a Kogge-Stone architecture. Various embodiments utilize single-ended domino circuits, to which are input single-ended primary addends. Dual-function generator circuits generate differential sum and sum-complement output signals. The use of low $V_T$ devices and full CMOS circuitry provides a relatively high degree of noise immunity. Also described are a microprocessor having an ALU incorporating one or more of the adder circuits, as well as a method of adding two numbers which generates differential sum and sum-complement outputs but does not use full-differential domino circuits, thus providing considerable savings in circuit area, circuit conductors, and layout complexity.

28 Claims, 18 Drawing Sheets

NOISE-TOLERANT DIGITAL ADDER CIRCUIT AND METHOD

TECHNICAL FIELD

Embodiments of the invention relate to the field of semiconductor devices and, more particularly, to an adder circuit and method for use in an integrated circuit component, such as a microprocessor, and in a digital computer system.

BACKGROUND INFORMATION

The users of digital computers have a virtually insatiable demand for computers that operate at faster and faster clock speeds and which are increasingly lighter in weight and portable, and which thus require relatively low power to operate. Thus, the manufacturers of digital computers, and of the microprocessor "brains" that go into them, are constantly looking for ways to increase their processing speeds that don't require more power.

Digital addition constitutes a fundamental operation of virtually all microprocessors and digital computer systems, not only to provide basic addition functions but also to provide many other logical operations. Addition, and other arithmetic operations, are generally performed by an arithmetic logic unit (ALU) contained with the computer's processor unit.

Digital addition is also one of the performance-limiting operations in a microprocessor's internal circuitry, and it therefore has been a significant focus of high-performance ALU research over recent years.

FIG. 1 illustrates a simplified block diagram of a prior art Kogge-Stone adder, shown generally as 1. In this example, two 4-bit signals $A_i$ and $B_i$ are added together to form a SUM $S_i$. The $A_i$ and $B_i$ addends are fed into a Propagate/Generate circuit 2 along with a carry-in signal $C_{in}$, which also is fed unchanged into SUM circuit 8 as carry signal $C_O$.

The propagate and generate signals are generated within circuit 2, and they are subsequently output to a binary tree structure for calculating the carries. In this example, the tree structure comprises circuit 4, which calculates a first level ($g_x$, $p_x$) of generate and propagate terms along with carry signals $C_1$ and $C_2$, and it further comprises circuit 6, which calculates a second level ($g_y$, $p_y$) of generate and propagate terms along with carry signals $C_3$ and $C_4$. Carry signals $C_1$–$C_3$ are referred to as bit-carry signals, and carry signal $C_4$ is referred to as a sum-carry signal.

The multi-level tree structure is characteristic of Kogge-Stone adder architecture, and it is used to perform what is referred to as "carry-merging", "propagate/generate merging", or simply "P/G merging". As the number of bits in the addends increases, so do the number of levels in the carry propagation tree. In general, if N represents the addend bit-width, the number of P/G merging levels required is $\log_2 N$ (e.g., a bit-width of 16 requires 4 levels).

Addends $A_i$ and $B_i$ along with Carry signals $C_0$ through $C_3$ are summed in SUM circuit 8 to form the SUM $S_i$. The $C_4$ output of circuit 6 represents the carry signal for $S_i$.

The Kogge-Stone adder is widely used in microprocessor ALUs, due in part to the predictable $\log_2 N$ depth of the carry propagation tree, and in part to the limitation of fan-out at every stage to two, which helps retain device sizes significantly smaller (and more energy efficient) than other comparable architectures.

A known prior art circuit for implementing the Kogge-Stone adder in microprocessor ALUs is the fully-differential (also referred to as "dual rail") domino circuit. Here, both true and complementary inputs are required. The dual-rail domino circuit consumes these differential inputs and delivers differential SUM and SUM' outputs. (In the description the complement of a term or expression will be indicated either by a "prime" ' following or by a bar over the term or expression.)

A significant reason for generating both true and complementary sum outputs is because a microprocessor ALU has to perform both addition and subtraction operations using the same adder in a single cycle. Since the subtraction operation (A–B) in two's complement arithmetic is performed as (A+B'+1), differential outputs are necessary.

FIG. 2 illustrates a schematic diagram of a prior art fully-differential domino circuit 20. Circuit 1 is implemented in Complementary Metal Oxide Semiconductor (CMOS), and it includes a pair of P-type Metal Oxide Semiconductor (PMOS) transistors 22 and 24 coupled to the power supply voltage Vcc; a pair of inverter circuits 26 and 28; an N-type Metal Oxide Semiconductor (NMOS) Combinatorial Network 30; and an NMOS transistor 32 coupled to ground Vss. By way of example, three sets of complementary inputs A and A', B and B', and C and C', are shown input into Combinational Network 30. Complementary outputs Q and Q' are output from inverters 28 and 26, respectively. A clock signal is applied to the gates of P-type transistors 22 and 24, and it is also applied to the gate of N-type transistor 32.

The operation of fully-differential domino circuit 20 is well known to those of ordinary skill in the art. It is also well known how to implement a Kogge-Stone adder using fully-differential domino circuits as building blocks.

The use of fully-differential domino circuits requires a significant amount of circuit wiring layout, circuit area, and circuit complexity for performing complementary logic functions.

There is a substantial need in the semiconductor art for a fast, low-power domino circuit which is less complex and more efficient in terms of the amount of circuit wiring and area consumed.

In addition, there is a substantial need in the computer art for a microprocessor, and for a digital computer incorporating a microprocessor, which operate at very high speed and consume relatively little power.

SUMMARY OF THE INVENTION

Accordingly, in one embodiment of the invention there is provided an adder circuit comprising at least one single-ended domino circuit (also referred to herein as a "single-rail" domino circuit), and at least one dual-function generator circuit coupled to the at least one single-ended domino circuit and which generates differential sum and sum-complement output signals.

In another embodiment of the invention there is provided a processor comprising an arithmetic logic unit. The arithmetic logic unit includes an adder circuit comprising at least one single-ended domino circuit, and at least one dual-function generator circuit coupled to the at least one single-ended domino circuit and which generates differential sum and sum-complement output signals.

In yet another embodiment of the invention there is provided an integrated circuit comprising a processor having an arithmetic logic unit. The arithmetic logic unit includes an adder circuit comprising at least one single-ended domino circuit, and at least one dual-function generator circuit coupled to the at least one single-ended domino circuit and which generates differential sum and sum-complement output signals.

In a further embodiment of the invention there is provided a data processing system comprising a bus coupling components in the data processing system. A display and an external memory are coupled to the bus. Also coupled to the bus is a microprocessor comprising an arithmetic logic unit. The arithmetic logic unit includes an adder circuit comprising at least one single-ended domino circuit, and at least one dual-function generator circuit coupled to the at least one single-ended domino circuit and which generates differential sum and sum-complement output signals.

Yet a further embodiment of the invention includes a method of adding numbers, A and B, each having a plurality of bits. The method includes generating propagate and generate signals from single-ended expressions of A and B, generating differential carry signals from the propagate and generate signals, and producing differential sum and sum-complement output signals from the differential carry signals and from single-ended expressions of A and B.

Other embodiments are described and claimed.

DETAILED DESCRIPTION

In the following detailed description, reference is made to the accompanying drawings which form a part hereof, and in which is shown by way of illustration specific embodiments in which the disclosure may be practiced. It is to be understood that other embodiments may be utilized and structural changes may be made without departing from the scope of the present disclosure.

Figure 1:
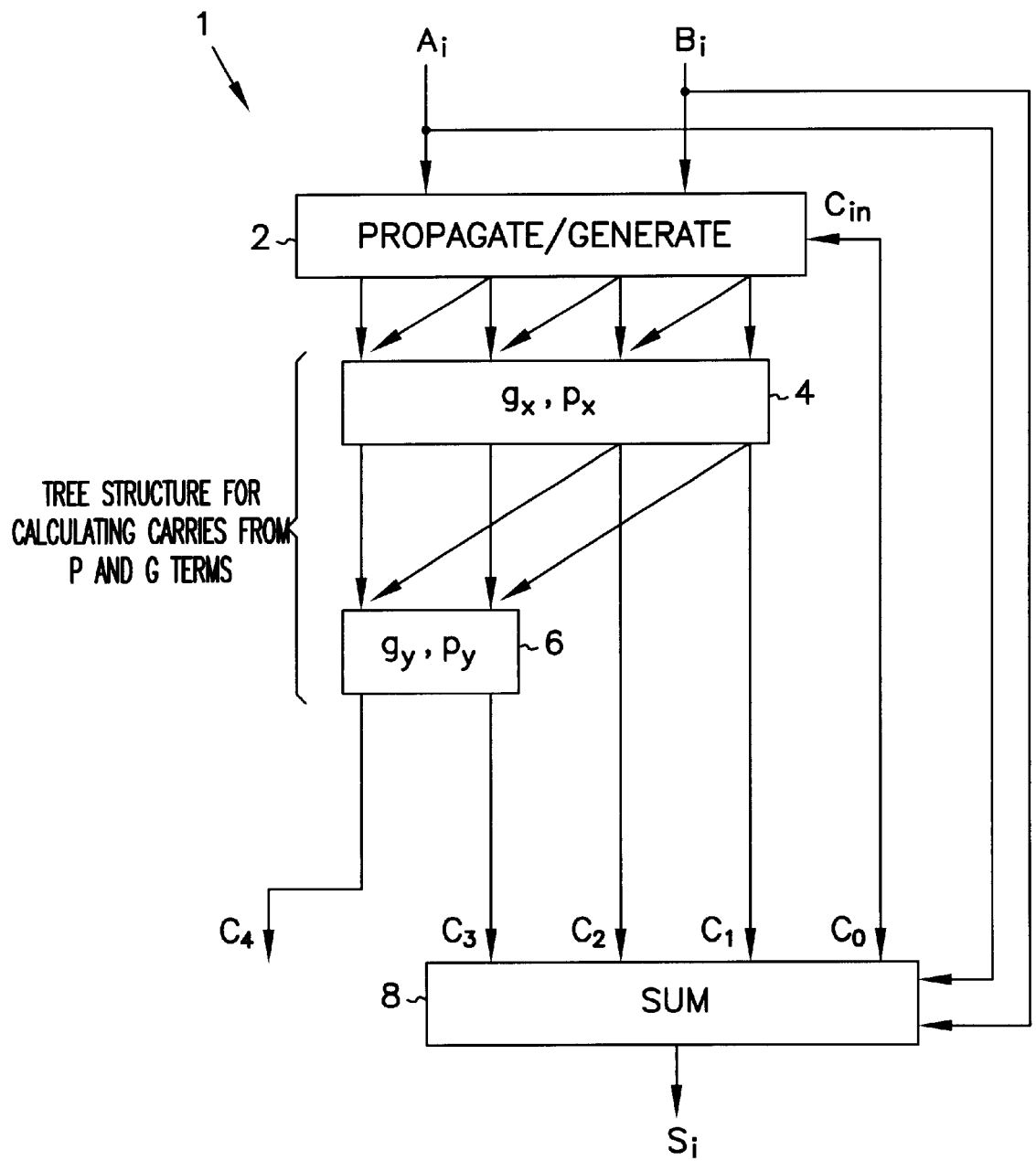
FIG. 1 illustrates a simplified block diagram of a prior art Kogge-Stone adder.
Figure 2:
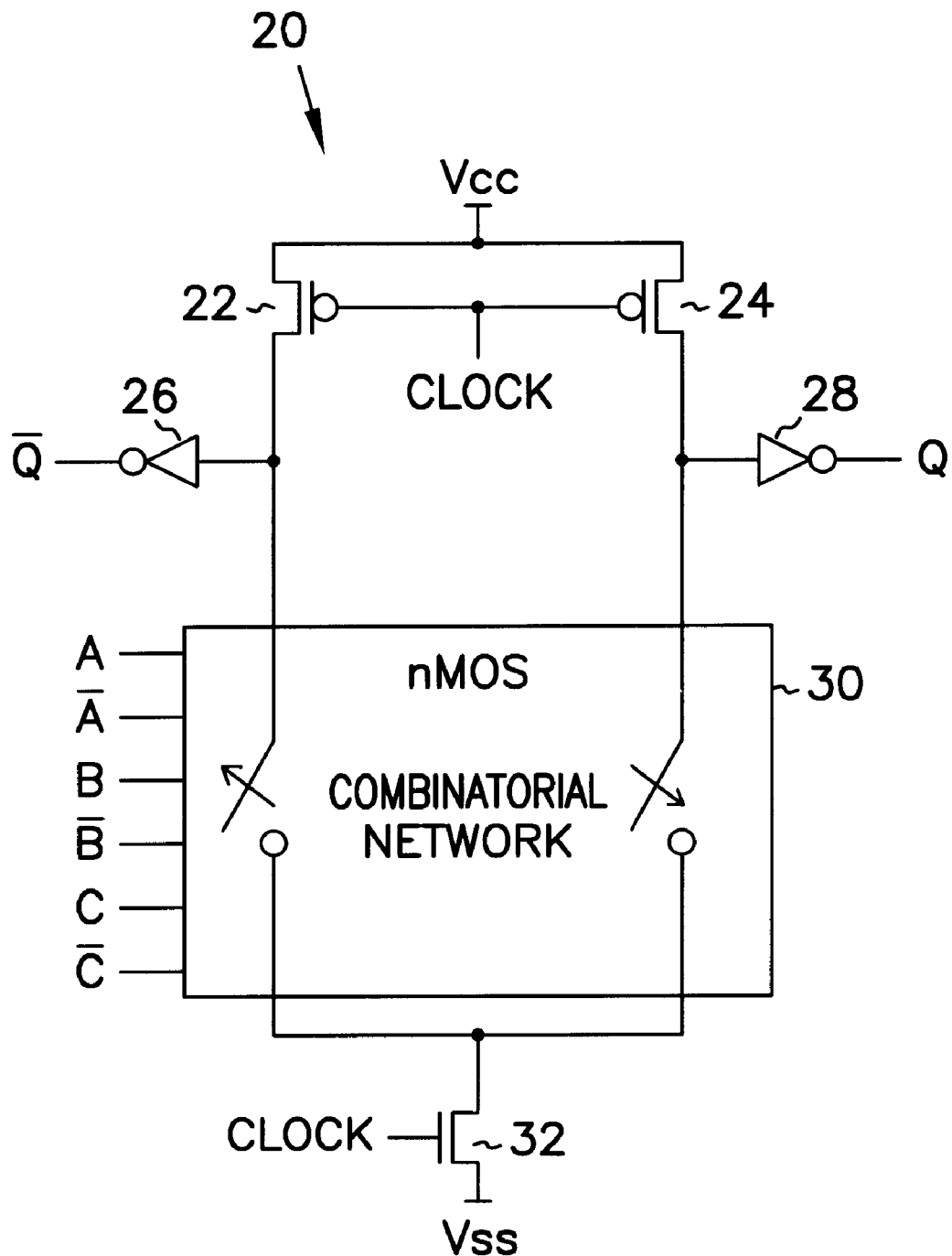
FIG. 2 illustrates a schematic diagram of a prior art fully-differential domino circuit.
Figure 3:
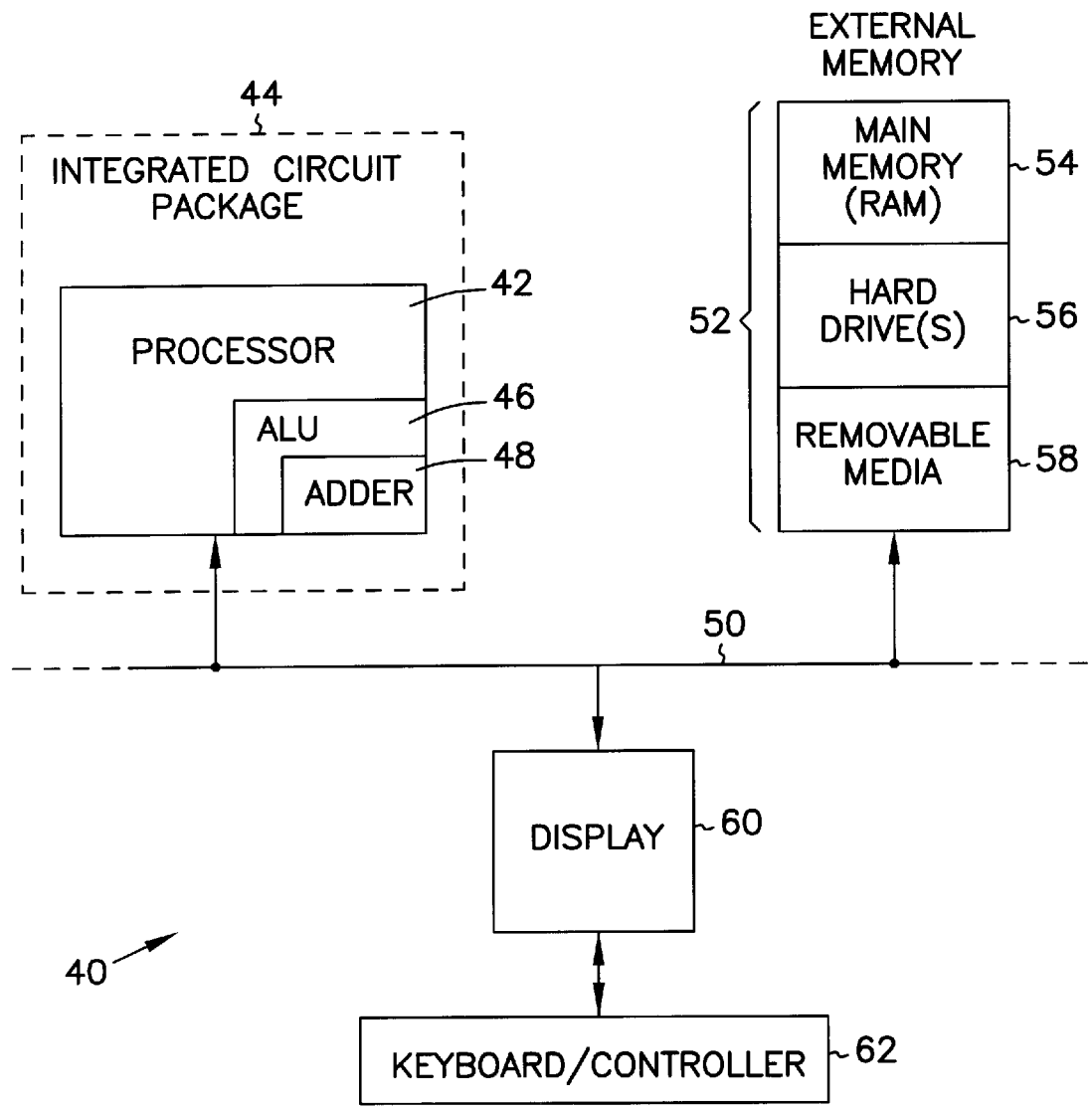
FIG. 3 illustrates a block diagram of a computer system incorporating a noise-tolerant digital adder circuit in accordance with one embodiment of the invention.

FIG. 3 illustrates a block diagram of a data processing system 40 incorporating a noise-tolerant digital adder circuit 48 in accordance with one embodiment of the invention. Data processing system 40 includes a system bus 50 which couples the various components of the system. System bus 50 provides communications links among the various components of data processing system 40 and can be implemented as a single bus, as a combination of busses, or in any other suitable manner.

A processor 42 is coupled to system bus 50. In one embodiment, processor 42 is a microprocessor which is part of an integrated circuit package 44; however, processor 42 can be packaged in any manner and be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLW) microprocessor, a graphics processor, a digital signal processor, or any other type of processor or processing circuit. Integrated circuit 42 can include any type of circuit, such as a microprocessor, a custom circuit, an application-specific integrated circuit (ASIC), or the like, such as a communications circuit for use in wireless devices like cellular telephones, pagers, portable computers, two-way radios, and similar products. Integrated circuit 42 could also be a circuit which does not include a processor but which performs computations.

Processor 42 comprises an arithmetic logic unit (ALU) 46 for performing a wide variety of logic and arithmetic functions. ALU comprises at least one adder circuit 48 for performing arithmetic operations such as addition, multiplication, subtraction, comparison, and shift. Addition is typically the most commonly performed arithmetic operation in the datapath of a processor. It is often the speed-limiting factor, so that optimization of adder circuits can provide significant advantages in overall processor operation.

Data processing system 40 also includes an external memory 52, which in turn can include main memory 54 in the form of random access memory (RAM), one or more hard drives 56, and one or more drives that handle removable media 58 such as floppy diskettes, compact disks (CDS), digital video disk (DVD), and the like.

Data processing system 40 also includes a display device 60 and a keyboard and/or controller 62, which permit a system user to input information into and derive information from the data processing system 40.

Figure 4:
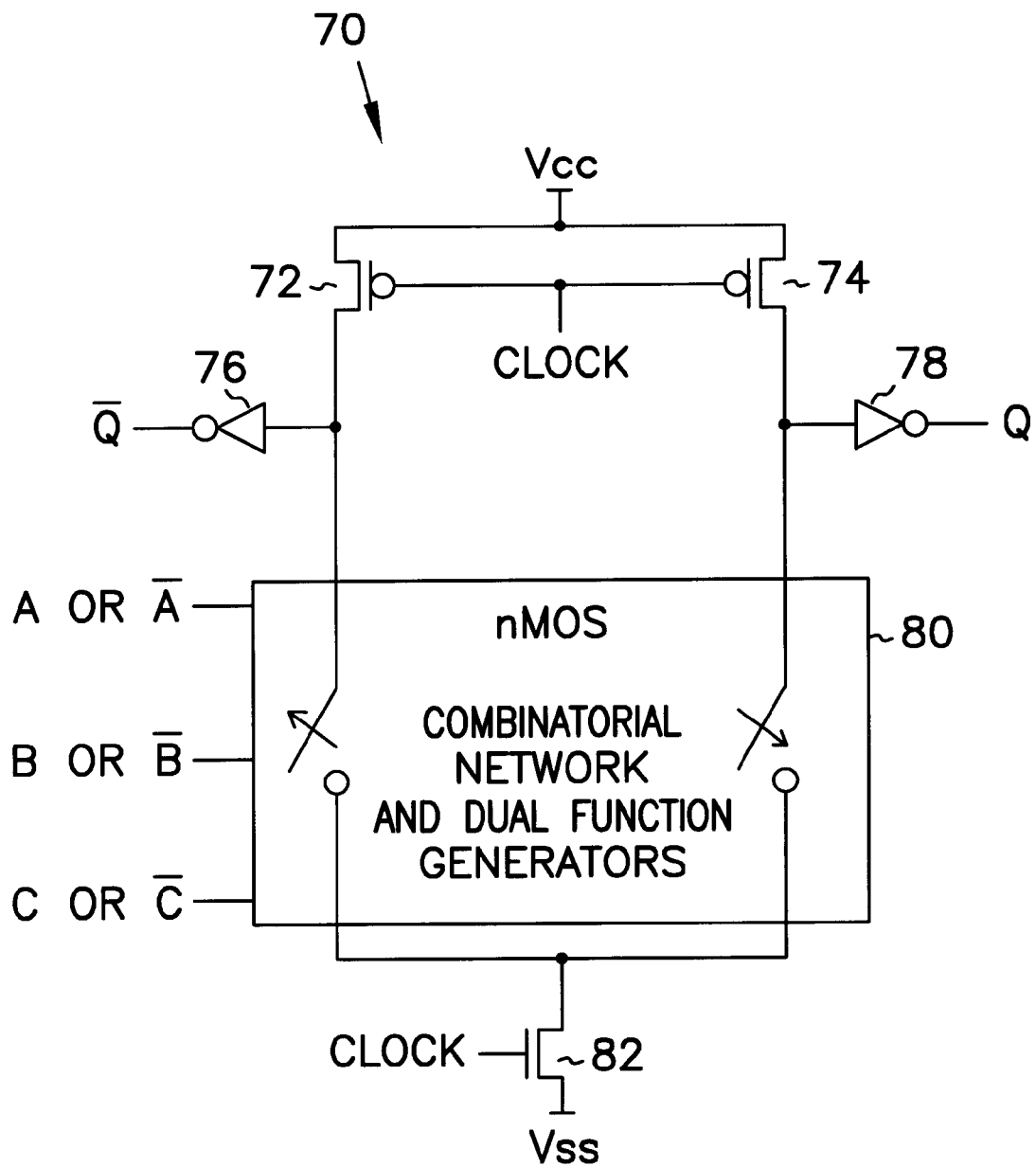
FIG. 4 illustrates a schematic diagram of a single-ended domino circuit with dual-function generators as used in various embodiments of the invention.

FIG. 4 illustrates a schematic diagram of a single-ended domino circuit 70 with dual-function generators 80 as used in various embodiments of the invention. Circuit 70 is implemented in Complementary Metal Oxide Semiconductor (CMOS), and it includes a pair of P-type Metal Oxide Semiconductor (PMOS) transistors 72 and 74 coupled to the power supply voltage Vcc; a pair of inverter circuits 76 and 78; an N-type Metal Oxide Semiconductor (NMOS) Combinatorial Network and Dual Function Generators 80; and an NMOS transistor 82 coupled to ground Vss.

In operation, a dynamic or domino CMOS gate typically comprises an NMOS logic network having an output node that is pre-charged to Vcc with a clocked PMOS device and conditionally discharged (evaluated) by the particular logic levels at the inputs to the network of NMOS devices connected to Vss. As mentioned earlier, fully-differential or dual-rail domino logic circuits include a complete set of logic circuitry for both the true and complementary values of the signal inputs. Embodiments of the present invention provide a single-rail domino implementation of an adder circuit, such as a Kogge-Stone adder, that requires significantly less circuitry, circuit area, and circuit complexity, resulting in semiconductor products which are less expensive to manufacture while providing equivalent or higher performance and requiring relatively low power to operate.

In the embodiment shown, three sets of single-ended inputs A or A', B or B', and C or C', are shown input into Combinational Network and Dual Function Generators 80. Complementary outputs Q and Q' are output from inverters 78 and 76, respectively. A clock signal is applied to the gates of P-type transistors 72 and 74, and it is also applied to the gate of N-type transistor 82.

In the description the term "single-ended" is used to designate a parameter having a single logic level, as distinguished from the term "differential" which is used to designate a parameter comprising a pair of logic levels. For example, a single-ended expression for parameter A (which is typically a multiple-bit number) is either A or A' (A' representing the complement or inverse of A), whereas a differential expression for parameter A comprises both A and A'.

In the following description three different embodiments of noise-tolerant digital adder circuits will be discussed in which single-ended domino circuits are substituted for fully differential domino circuits in implementing high-speed, low power adder circuits based upon a Kogge-Stone architecture.

In the embodiments described herein, two single-ended numbers A and B, each having a plurality of bits, are added. The adder includes P/G merge circuitry that generates propagate and generate signals only from the single-ended A,B pair, i.e. from the group consisting of A and B, A' and B, A and B', or A' and B'. The adder includes further circuitry that generates differential carry signals from the propagate and generate signals, and it also includes circuitry that produces differential sum and sum-complement output signals from the differential carry signals and from the A,B pair.

In the embodiments described below, domino-compatible dual-function generators are used to internally generate the true and complementary outputs without explicitly using differential circuits, resulting in significant wiring and area savings. Further, the widest domino fan-in is limited to two, resulting in a circuit implementation in which all threshold voltages ($V_T$) are low, thus providing substantial noise tolerance and minimal input pattern-dependent delay variations.

Four NMOS-Stacked

Single-PMOS Pullup Adder Embodiments

A first embodiment of a noise-tolerant digital adder circuit is described with reference to FIGS. 5–11. The adder circuit comprises a first propagate/merge logic stage (shown in FIGS. 5–8) for performing a first level of P/G merging and outputting intermediate propagate and generate signals; a second propagate/merge logic stage (shown in FIG. 9) for performing a second level of P/G merging and outputting further intermediate propagate and generate signals; a third differential carry generator logic stage (shown in FIG. 10) for generating the differential carry outputs $C_i$ and $C'_i$; and a final sum generator stage (shown in FIG. 11) for generating the differential sum signals or outputs $SUM_i$ and $SUM'_i$. The differential carry outputs $C_i$ and $C'_i$ are generated from single-ended primary inputs, eliminating half the circuit wiring and complementary logic required for a dual-rail domino implementation.

The circuit diagrams which make up the first embodiment will now be discussed.

Figure 5:
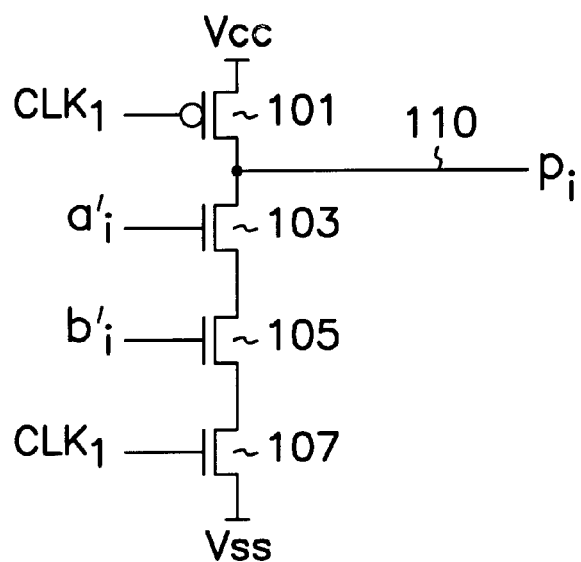
FIG. 5 illustrates a circuit diagram for generating a $p_i$ term in one embodiment of the invention.
Figure 22:
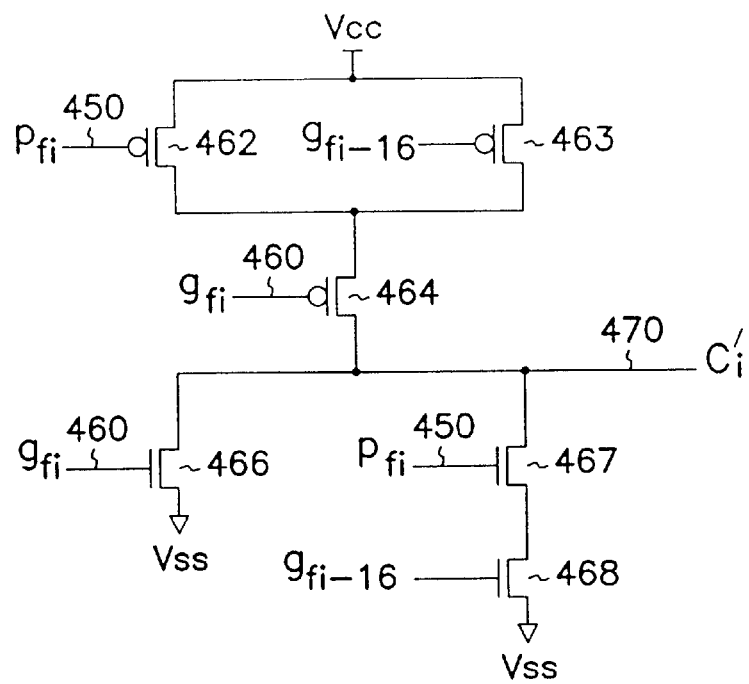
FIG. 22 illustrates a circuit diagram for generating a $c'_i$ term in one embodiment of the invention.

FIG. 5 illustrates a circuit diagram for generating a $p_i$ term in one embodiment of the invention. The circuit comprises a P-type transistor 101 which has its gate coupled to clock $clk_1$. (Clock signals $clk_1$ through $clk_4$ are illustrated in FIG. 22 and discussed below.) The drain of P-type transistor 101 is coupled to the supply voltage Vcc, and its source is coupled to the drain of N-type transistor 103, whose gate is coupled to input signal $a'_i$.

The adder circuit adds two numbers (also referred to as "addends") A and B, each of which comprise a number of binary bits, so that they are represented more generally by $A_i$ and $B_i$. A particular bit of A is notated as $a_i$, indicating the ith bit position of addend $A_i$. A corresponding notation $b_i$ is used to indicate the ith bit position of addend $B_i$. The notation $a'_i$ represents the twos-complement of $a_i$, and $b'_i$ represents the twos-complement of $b_i$. In one embodiment the adder circuit is a 32-bit adder, but the principles of the disclosure can be applied to adders handling any number of bits.

The source of N-type transistor 103 is coupled to the drain of N-type transistor 105, whose gate is coupled to $b'_i$. The source of N-type transistor 105 is coupled to the drain of N-type transistor 107, whose gate is coupled to clock signal $clk_1$, and whose source is coupled to ground potential Vss. The source of P-type transistor 101 is coupled to output conductor 110 over which is generated signal $p_i$. (The logic performed by each stage of the adder circuit of Embodiment #1 is given by Equations 1–8 discussed below.)

Figure 6:
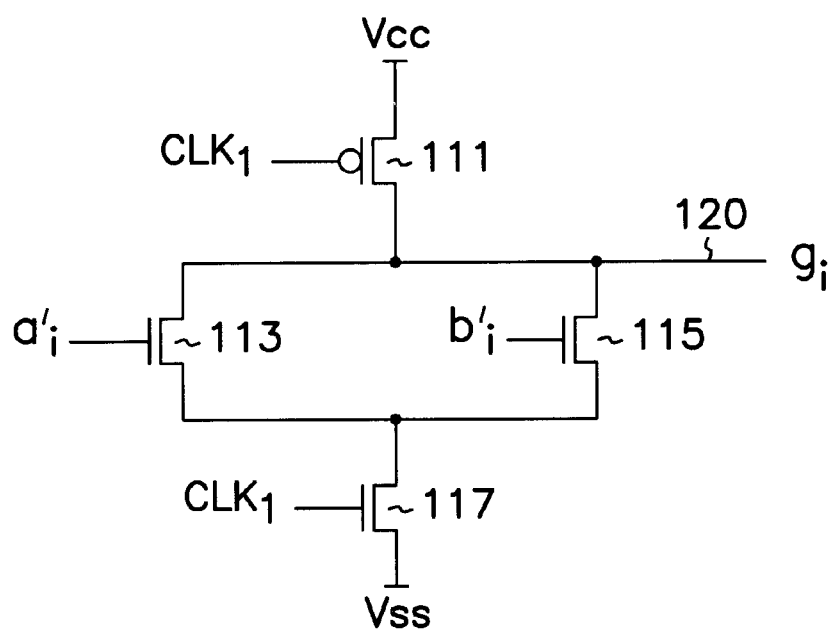
FIG. 6 illustrates a circuit diagram for generating a $g_i$ term in one embodiment of the invention.

FIG. 6 illustrates a circuit diagram for generating a $g_i$ term in one embodiment of the invention. P-type transistor 11 has its source coupled to the drains of N-type transistors 113 and 115 and to output line 120 over which is generated signal $g_i$. N-type transistor 113 has its gate coupled to input signal $a'_i$, and N-type transistor 115 has its gate coupled to input signal $b'_i$. The sources of N-type transistors 113 and 115 are coupled to the drain of N-type transistor 117, whose gate is coupled to $clk_1$ and whose source is coupled to Vss.

Figure 7:
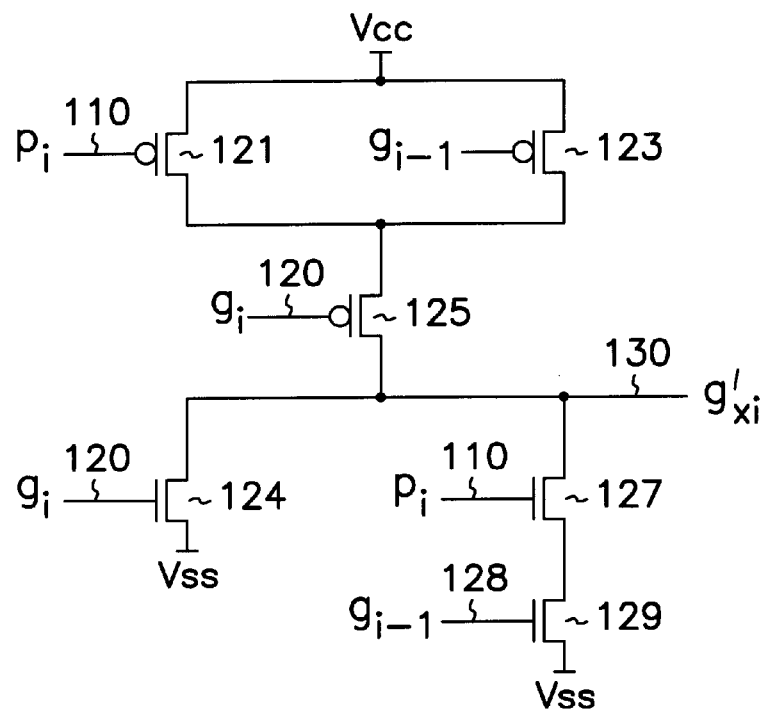
FIG. 7 illustrates a circuit diagram for generating a $g'_{x1}$ term in one embodiment of the invention.

FIG. 7 illustrates a circuit diagram for generating a $g'_{x1}$ term in one embodiment of the invention. A pair of P-type transistors 110 and 123 have their drains coupled to Vcc, their gates coupled to $p_i$ and gi–1, respectively, and their sources coupled to the drain of P-type transistor 125, whose gate is coupled to $g_i$, and whose source is coupled to output line 130 over which $g'_{x-1}$ is generated. The source of P-type transistor 125 is also coupled to the drains of N-type transistors 124 and 127, whose gates are coupled to $g_i$ and $p_i$, respectively. The source of N-type transistor 124 is coupled to Vss. The source of N-type transistor 127 is coupled to the drain of N-type transistor 129, whose gate is coupled to $g_{i-1}$, and whose source is coupled to Vss.

Figure 8:
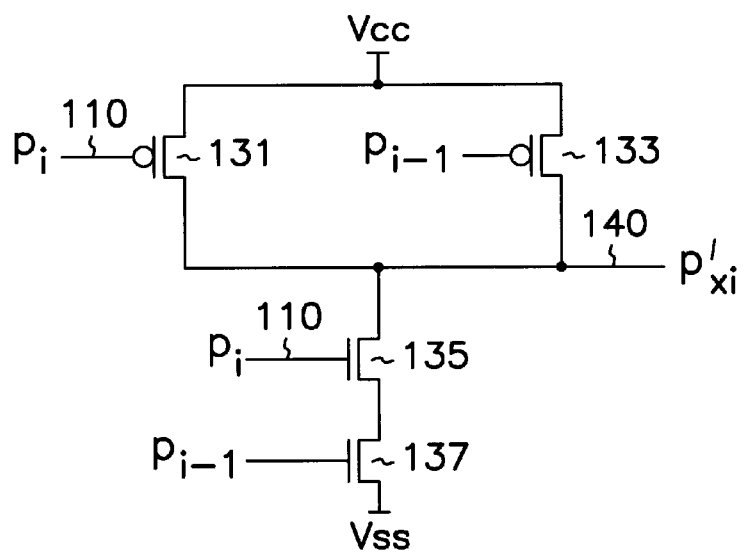
FIG. 8 illustrates a circuit diagram for generating a $p'_{x1}$ term in one embodiment of the invention.

FIG. 8 illustrates a circuit diagram for generating a $p'_{x1}$ term in one embodiment of the invention. A pair of P-type transistors 110 and 133 have their drains coupled to Vcc, their gates coupled to $p_i$ and $p_{i-1}$, respectively, and their sources coupled to output line 140 over which output signal $p'_{xi}$ is generated, and to the drain of N-type transistor 135. The gate of N-type transistor 135 is coupled to $p_i$, and its source is coupled to the drain of N-type transistor 137, whose gate is coupled to $p_{i-1}$, and whose source is coupled to Vss.

Figure 9:
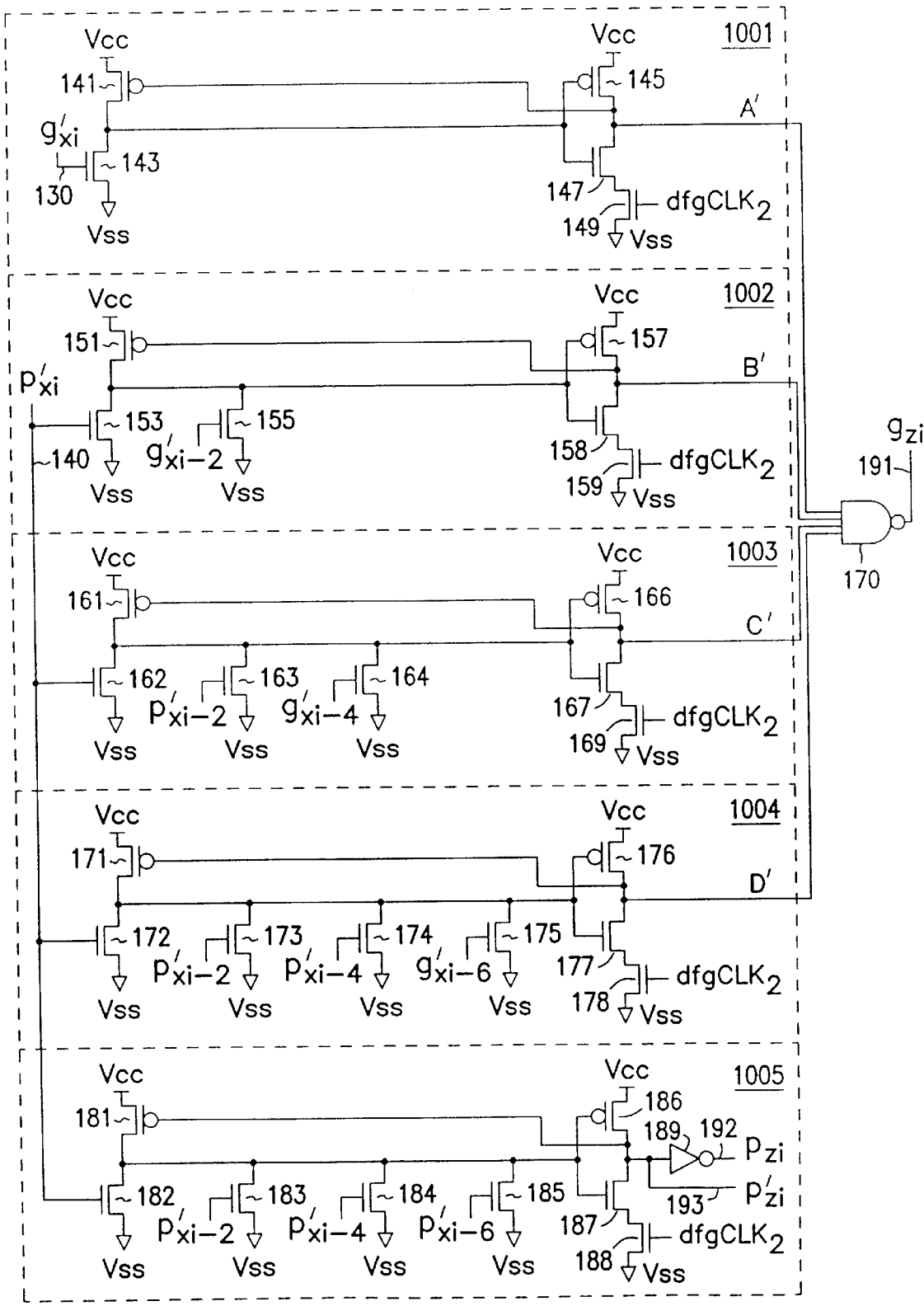
FIG. 9 illustrates a circuit diagram for generating $g_{zi}$ and $p_{zi}$ terms in one embodiment of the invention.

FIG. 9 illustrates a circuit diagram for generating $g_{zi}$ and $p_{zi}$ terms in one embodiment of the invention. A 4-input NAND gate 170 receives inputs A', B', C', and D', respectively, from four circuits 1001–1004 and generates $g_{zi}$. Circuit 1001 includes P-type transistors 141 and 145 whose drains are coupled to Vcc and whose gates are cross-coupled to their respective sources in a cascode feedback manner. The source of P-type transistor 141 is also coupled to the drain of N-type transistor 143, whose gate is coupled to $g'_{xi}$, and whose source is coupled to Vss.

The source of P-type transistor 145 is coupled as one input to NAND gate 170, as well as to the drain of N-type transistor 147, whose gate is coupled to the gate of P-type transistor 145, and whose source is coupled to the drain of N-type transistor 149. The gate of N-type transistor 149 is coupled to a dual-function generator ("dfg") clock dfgclk$_2$, and its source is coupled to Vss. Dfgclk$_2$ is a clock signal which is delayed slightly, e.g. in the order of 10–20%, from clock signal clk$_2$ (refer to FIG. 23).

Circuit 1002 includes P-type transistors 151 and 157 whose drains are coupled to Vcc and whose gates are cross-coupled to their respective sources. The source of P-type transistor 151 is also coupled to the drains of N-type transistors 153 and 155. N-type transistors 153 and 155 have their gates coupled to $p'_{xi}$ and $g'_{xi-2}$, respectively, and their sources are coupled to Vss. The source of P-type transistor 157 is coupled to the drain of N-type transistor 158, whose gate is coupled to that of P-type transistor 157, and whose source is coupled to the drain of N-type transistor 159. The gate of N-type transistor 159 is coupled to dfgclk$_2$, and its source is coupled to Vss.

Circuit 1003 is similar to circuit 1002, except that it includes an additional N-type transistor 164 in parallel with the N-type transistor 163 receiving the "$x_{i-2}$" term. In circuit 1003, the gate of N-type transistor 163 is coupled to the term $p'_{xi-2}$, and the gate of N-type transistor 164 is coupled to $g'_{xi-4}$. The output of circuit 1003 is applied as an input to NAND gate 170.

Circuit 1004 is similar to circuit 1004, except that it includes an additional N-type transistor 175 (whose gate is coupled to $g'_{xi-6}$) in parallel with N-type transistor 173 (whose gate is coupled to $p'_{xi-2}$) and N-type transistor 174 (whose gate is coupled to $p'_{xi-4}$). The output of circuit 1004 is applied as an input to NAND gate 170.

Circuit 1005 generates the term $p_{zi}$ over line 192 from inverter 189, and it generates the term $p'_{zi}$ over line 193 at the input to inverter 189. Circuit 1005 is similar to circuit 1004, except that its N-type transistors 182–185 have gates coupled to $p'_{xi}$, $p'_{xi-2}$, $p'_{xi-4}$, and $p'_{xi-6}$, respectively. The source of P-type transistor 186 is coupled to the input of inverter 189.

Figure 10:
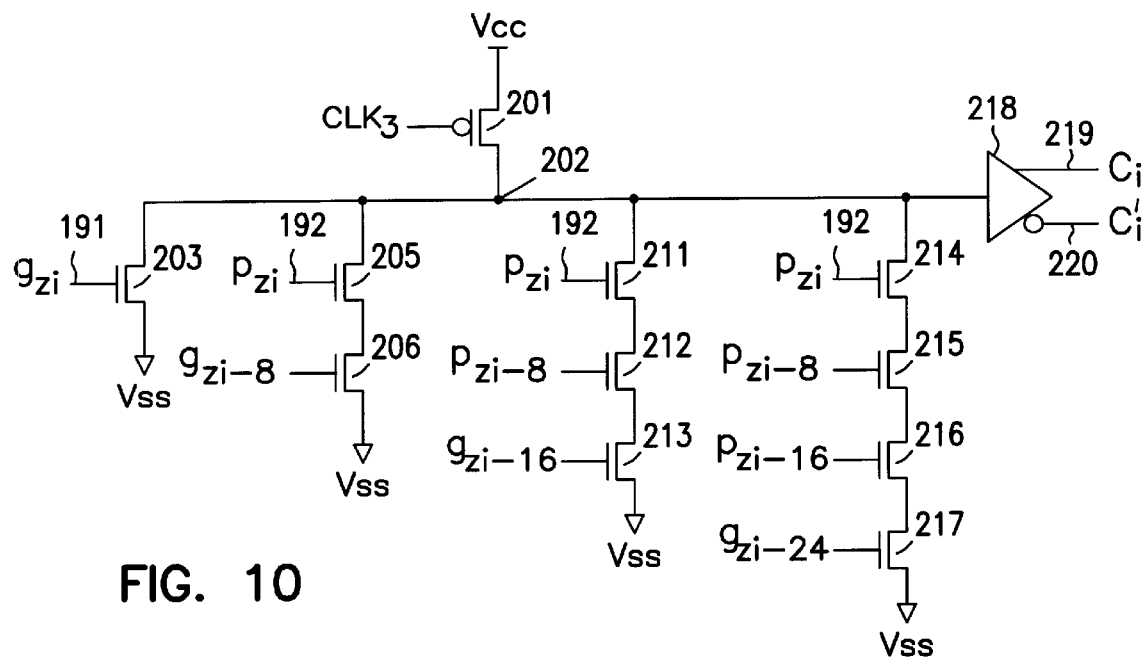
FIG. 10 illustrates a circuit diagram for generating $c_i$ and $c'_i$ terms in one embodiment of the invention.

FIG. 10 illustrates a circuit diagram for generating $c_i$ and $c'_i$ terms in one embodiment of the invention. The $c_i$ and $c'_i$ terms include at least one bit-carry signal and a sum-carry signal.

The circuit includes a P-type transistor 201 whose drain is coupled to Vcc, whose gate is coupled to clk$_3$, and whose source is coupled to node 202, which is coupled to the input of inverter 218. The non-inverted output of inverter 218 is $c_i$, while the inverted output is $c'_i$. Node 192 is coupled to the drains of N-type transistors 203, 205, 211, and 214. The gate of N-type transistor 203 is coupled to $g_{zi}$, while the gates of N-type transistors 205, 211, and 214 are all coupled to $p_{zi}$.

The source of N-type transistor 203 is coupled to Vss. The source of N-type transistor 205 is coupled to the drain of N-type transistor 206, whose gate is coupled to $g_{zi-8}$, and whose source is coupled to Vss. The source of N-type transistor 211 is coupled to the drain of N-type transistor 212, whose gate is coupled to $p_{zi-8}$, and whose source is coupled to the drain of N-type transistor 213. The gate of N-type transistor 213 is coupled to $g_{zi-6}$, and its source is coupled to Vss. The source of N-type transistor 214 is coupled to the drain of N-type transistor 215, whose gate is coupled to $p_{zi-8}$, and whose source is coupled to N-type transistor 216. The gate of N-type transistor 216 is coupled to $p_{zi-16}$, and its source is coupled to the drain of N-type transistor 217. The gate of N-type transistor 217 is coupled to $g_{zi-24}$, and its source is coupled to Vss.

Figure 11:
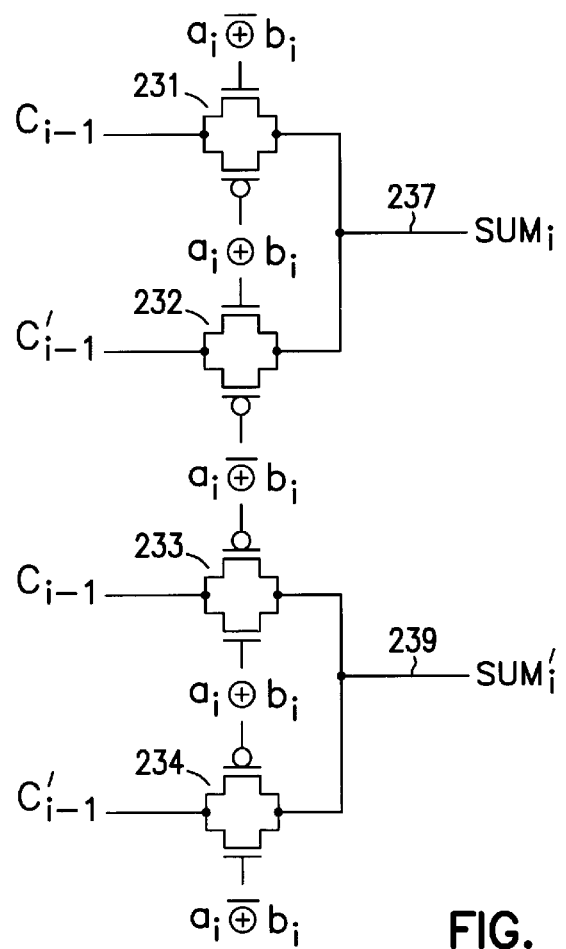
FIG. 11 illustrates a circuit diagram for generating $SUM_i$ and $SUM'_i$ terms in one embodiment of the invention.

FIG. 11 illustrates a circuit diagram for generating SUM$_i$ and SUM'$_i$ terms in one embodiment of the invention. The circuit includes transmission gates 231–234. In one embodiment transmission gates 231–234 are static transmission gates.

A transmission gate generates an output only if its input is high, and its N-type control gate is high and/or its P control terminal or control gate is low. For example, transmission gate 231 generates SUM$_i$ high only if $c_{i-1}$ is high, and $a_i \oplus b_i$ is high and/or $a_i \oplus b_i$ is low.

Transmission gates 231 and 232 have inputs coupled to $c_{i-1}$ and $c'_{i-1}$, respectively, and they have outputs coupled together and generating SUM$_i$. Transmission gates 231 and 232 each have a pair of control terminals coupled to a logical combination of the single-ended addend inputs, $a_i$ and $b_i$, and to the complement of such logical combination. In the embodiment shown in FIG. 11, the logical combination is the Exclusive-OR of $a_i$ and $b_i$ (i.e., $a_i \oplus b_i$), and it is coupled to the P control terminal of each transmission gate 231 and 232. An Exclusive-NOR logical combination (i.e., $a_i \overline{\oplus} b_i$), is coupled to the N-type control terminal of each transmission gate 231 and 232.

Transmission gates 233 and 234 have inputs coupled to $c_{i-1}$ and $c'_{i-1}$, respectively, and they have outputs coupled together and generating SUM'$_i$. Transmission gates 233 and 234 are similar to transmission gates 231 and 232, except that $a_i \oplus b_i$ is applied to the N-type control terminal of transmission gate 233 and the P control terminal of transmission gate 234, and $a_i \overline{\oplus} b_i$ is applied to the P control terminal of transmission gate 233 and the N-type control terminal of transmission gate 234.

The logic expressions implemented at each stage of Embodiment #1 are given as follows:

Stage 1

$$g'_{xi}=(g_i+p_ig_{i-1})' \quad \text{(Equation 1)}$$

$$p'_{xi}=(p_ip_{i-1})' \quad \text{(Equation 2)}$$

Stage 2

$$g_{zi}=g_{xi}+p_{xi}g_{xi-2}+p_{xi}p_{xi-2}g_{xi-4}+p_{xi}p_{xi-2}p_{xi-4}g_{xi-6} \quad \text{(Equation 3)}$$

$$p_{zi}=p_{xi}p_{xi-2}p_{xi-4}p_{xi-6} \quad \text{(Equation 4)}$$

Stage 3

$$c_i=g_{zi}+p_{zi}g_{zi-8}+p_{zi}p_{zi-8}g_{zi-16}+p_{zi}p_{zi-8}p_{zi-16}g_{zi-24} \quad \text{(Equation 5)}$$

$$c'_i=(g_{zi}+p_{zi}g_{zi-8}+p_{zi}p_{zi-8}g_{zi-16}+p_{zi}p_{zi-8}p_{zi-16}g_{zi-24})' \quad \text{(Equation 6)}$$

Stage 4

$$SUM_i=a_i \oplus b_i \oplus c_{i-1} \quad \text{(Equation 7)}$$

$$SUM'_i=a_i \overline{\oplus} b_i \overline{\oplus} c_{i-1} \quad \text{(Equation 8)}$$

Single-NMOS Pulldown

Single-PMOS Pullup Adder Embodiment

A second embodiment of a noise-tolerant digital adder circuit is described with reference to FIGS. 5–8, 12–15 and 11. The circuit employs the same first propagate/merge logic stage (FIGS. 5–8) as used by Embodiment #1 for performing a first level of P/G merging. The circuit also comprises second and third propagate/merge logic stages (FIGS. 12–13) for performing second and third levels of P/G merging; fourth and fifth propagate/merge logic stages (FIGS. 14–15) for performing fourth and fifth levels of P/G merging and for generating the differential carry outputs $C_i$ and $C'_i$; and a sixth stage (FIG. 11), which is the same logic as used by Embodiment #1, for generating the differential sum outputs $SUM_i$ and $SUM'_i$.

Embodiment #2 creates the differential carry outputs using cascode feedback dual-function generator circuits from single-ended inputs, eliminating half the circuit wiring and complementary logic required for a dual-rail domino implementation.

Figure 12:
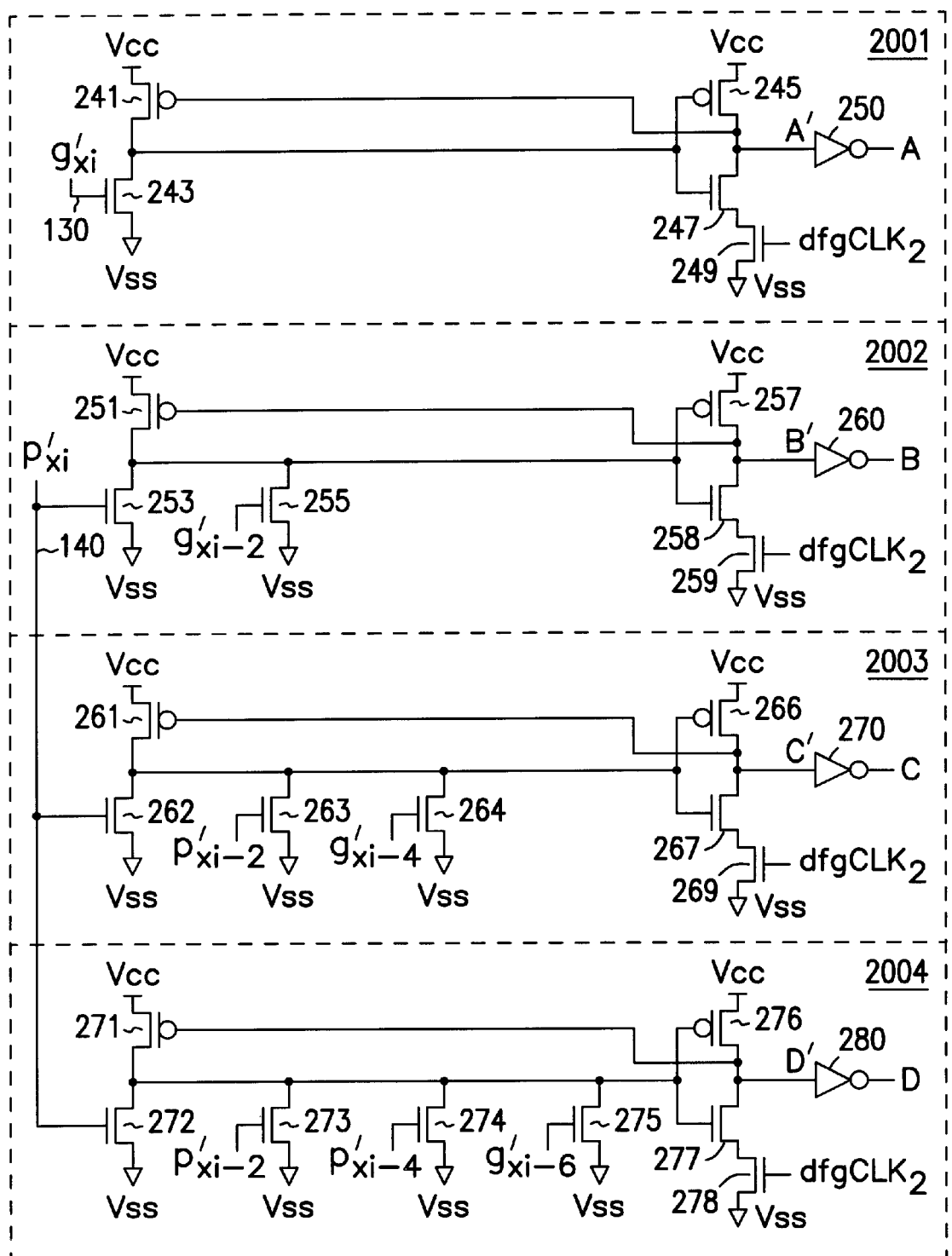
FIG. 12 illustrates a circuit diagram for generating A, B, C, and D terms in one embodiment of the invention.

FIG. 12 illustrates a circuit diagram for generating A, B, C, and D terms in one embodiment of the invention. The A, B, C, and D terms are generated by individual circuits 2001, 2002, 2003, and 2004, respectively. Circuit 2001 is identical to circuit 1001 of FIG. 9, except that circuit 2001 additionally includes inverter 250, which inverts signal A' to generate term A. Likewise, circuits 2002–2004 can be identical to circuits 1002–1004, respectively, of FIG. 9, except that circuits 2002–2004 include inverters 260, 270, and 280, respectively.

Figure 13:
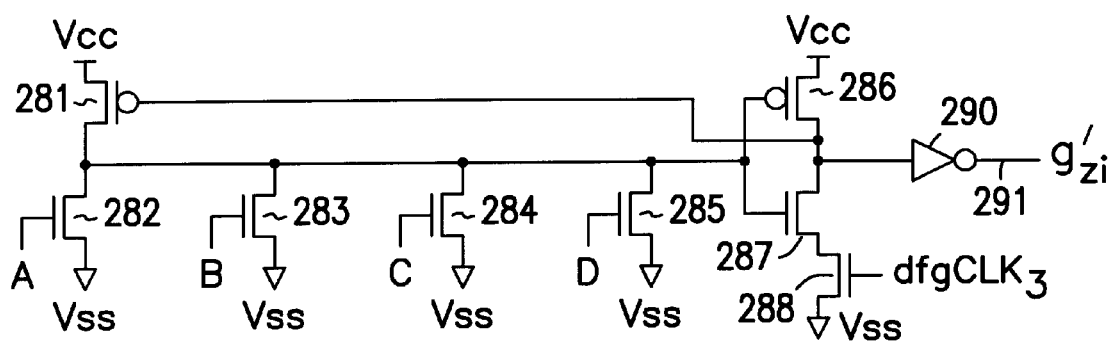
FIG. 13 illustrates a circuit diagram for generating a $g'_{zi}$ term in one embodiment of the invention.

FIG. 13 illustrates a circuit diagram for generating a $g'_{zi}$ term in one embodiment of the invention. The circuit is very similar to circuit 1005 of FIG. 9, except that in FIG. 13 the gates of N-type transistors 282–285 are coupled to signals A–D, respectively, generated by the circuit of FIG. 12. Also, N-type transistor 288 is controlled by dfgclk$_3$ rather than dfgclk$_2$. The circuit of FIG. 13 generates $g'_{zi}$ at the output of inverter 290.

Figure 14:
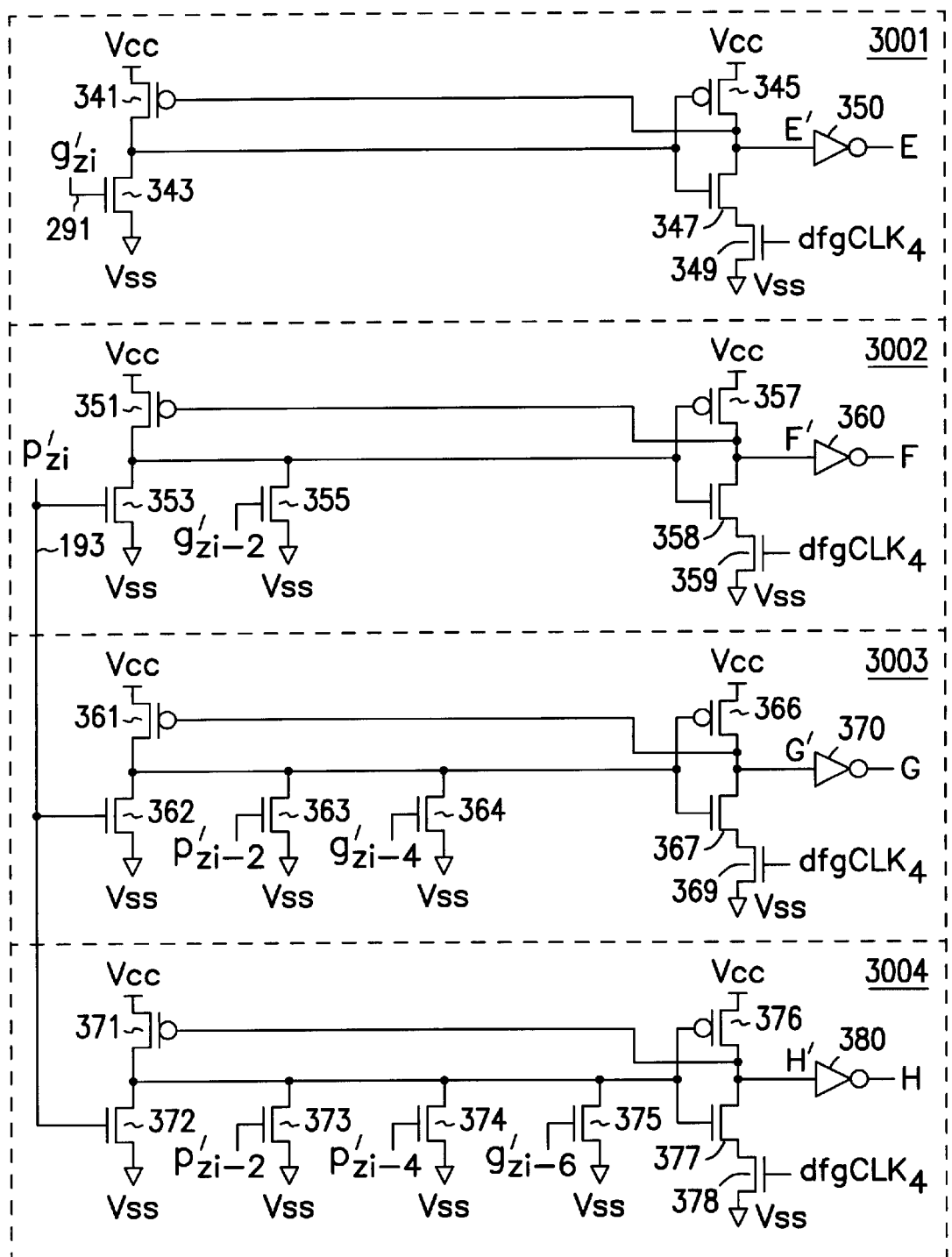
FIG. 14 illustrates a circuit diagram for generating E, F, G, and H terms in one embodiment of the invention.

FIG. 14 illustrates a circuit diagram for generating E, F, G, and H terms in one embodiment of the invention. The E, F, G, and H terms are generated by individual circuits 3001, 3002, 3003, and 3004, respectively. Circuits 3001–3004 are identical to circuits 2001–2004 of FIG. 12, respectively. The various signals which are coupled to the gates of the N-type transistors are also identical, if "z" is substituted for "x" in the subscripts in the "p" and "g" terms, and if dfgclk$_4$ is substituted for dfgclk$_2$.

Figure 15:
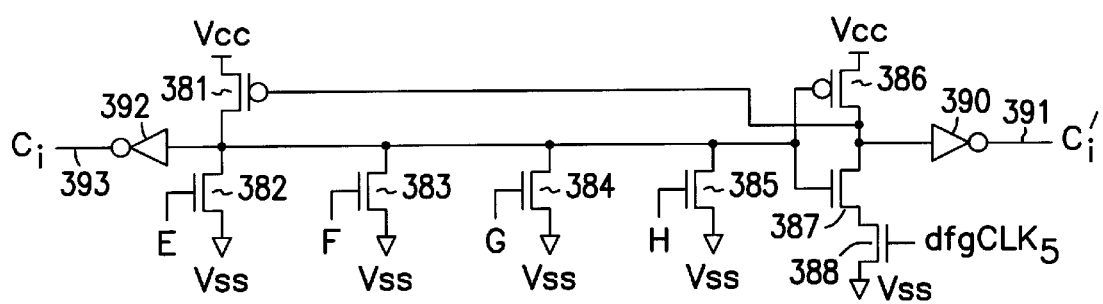
FIG. 15 illustrates a circuit diagram for generating $C_i$ and $C'_i$ terms in one embodiment of the invention.

FIG. 15 illustrates a circuit diagram for generating $C_i$ and $C'_i$ terms in one embodiment of the invention. The circuit is virtually identical to that of FIG. 13, except that the signals coupled to the gates of N-type transistors 382–385 are E, F, G, and H, respectively, rather than A, B, C, and D, respectively. Also, dfgclk$_5$ is substituted for dfgclk$_3$ on the gate of N-type transistor 388. The circuit also additionally includes inverter 392 whose input is coupled to the drains of N-type transistors 382–385 and whose output is the $c_i$ term. Inverter 390 outputs the $c'_i$ term.

The logic expressions implemented at each stage of Embodiment #2 are given as follows:

Stage 1

$$g'_{xi}=(g_i+p_ig_{i-1})' \quad \text{(Equation 9)}$$

$$p'_{xi}=(p_ip_{i-1})' \quad \text{(Equation 10)}$$

The $g'_{xi}$ and $p'_{xi}$ terms are generated by circuits identical to those shown in FIGS. 5–8.

Stage 2

$$A=g_{xi} \quad \text{(Equation 11)}$$

$$B=p_{xi}g_{xi-2} \quad \text{(Equation 12)}$$

$$C=p_{xi}p_{xi-2}g_{xi-4} \quad \text{(Equation 13)}$$

$$D=p_{xi}p_{xi-2}p_{xi-4}g_{xi-6} \quad \text{(Equation 14)}$$

Stage 3

$$g'_{zi}=[g_{xi}+p_{xi}g_{xi-2}+p_{xi}p_{xi-2}g_{xi-4}+p_{xi}p_{xi-2}p_{xi-4}g_{xi-6}]'=[A+B+C+D]' \quad \text{(Equation 15)}$$

$$p'_{zi}=[p'_{xi}+p'_{xi-2}+p'_{xi-4}+p'_{xi-6}]'=p_{xi}p_{xi-2}p_{xi-4}p_{xi-6} \quad \text{(Equation 16)}$$

The generation of the $p'_{zi}$ term for Embodiment #2, while not explicitly shown, can be generated by a circuit similar to circuit 1005 of FIG. 9.

Stage 4

$$E=(g'_{zi})=g_{zi} \quad \text{(Equation 17)}$$

$$F=(p'_{zi}g'_{zi-8})'=p_{zi}g_{zi-8} \quad \text{(Equation 18)}$$

$$G=(p'_{zi}+p'_{zi-8}+g'_{zi-16})'=p_{zi}p_{zi-8}g_{zi-16} \quad \text{(Equation 19)}$$

$$H=(p'_{zi}+p'_{zi-8}+p'_{zi-16}+g'_{zi-24})'=p_{zi}p_{zi-8}p_{zi-16}g_{zi-24} \quad \text{(Equation 20)}$$

Stage 5

$$c_i=g_{zi}+p_{zi}g_{zi-8}+p_{zi}p_{zi-8}g_{zi-16}+p_{zi}p_{zi-8}p_{zi-16}g_{zi-24}=[D+F+G+H] \quad \text{(Equation 21)}$$

$$c'_i=(g_{zi}+p_{zi}g_{zi-8}+p_{zi}p_{zi-8}g_{zi-16}+p_{zi}p_{zi-8}p_{zi-16}g_{zi-24})'=[E+F+G+H]' \quad \text{(Equation 22)}$$

Stage 6

$$SUM_i=a_i \oplus b_i \oplus c_{i-1} \quad \text{(Equation 23)}$$

$$SUM'_i=a_i \overline{\oplus} b_i \overline{\oplus} c_{i-1} \quad \text{(Equation 24)}$$

The $SUM_i$ and $SUM'_i$ terms are generated by a circuit identical to that shown in FIG. 11.

Two NMOS-Stacked Pulldown

Two PMOS-Stacked Pullup Adder Embodiment

A third embodiment of a noise-tolerant digital adder circuit is described with reference to FIGS. 5–8, 16–23, and 11. The circuit uses the same first propagate/merge logic stage (FIGS. 5–8) as employed by Embodiment #1 for performing a first level of P/G merging, except it creates $g_{xi}$ and $p_{xi}$ rather than their complements. The circuit also comprises second and third propagate/merge logic stages (FIGS. 16–23) for performing second and third levels of P/G merging and for generating the differential carry outputs $C_i$ and $C'_i$, and further comprises a fourth stage (FIG. 11), which is the same logic as used by Embodiments #1 and #2, for generating the differential sum outputs $SUM_i$ and $SUM'_i$.

Embodiment #3 creates the differential carry outputs using cascode feedback dual-function generator circuits from single-ended inputs, eliminating half the circuit wiring and complementary logic required for a dual-rail domino implementation.

Figure 16:
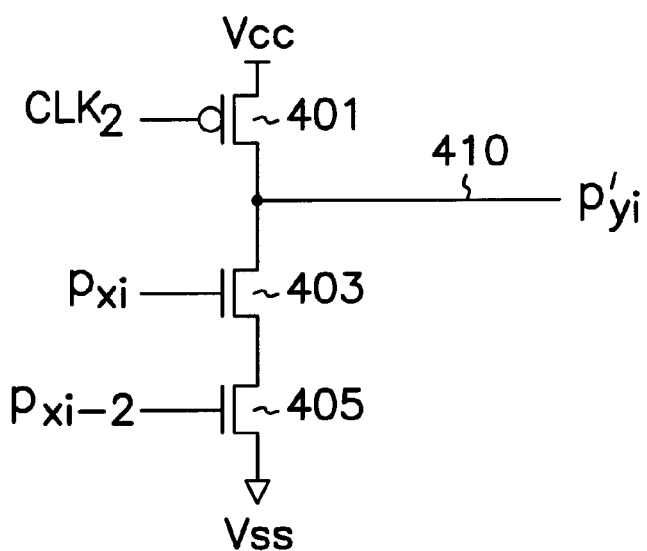
FIG. 16 illustrates a circuit diagram for generating a $p'_{yi}$ term in one embodiment of the invention.

FIG. 16 illustrates a circuit diagram for generating a $p'_{yi}$ term in one embodiment of the invention. The circuit comprises a P transistor 401 which has its gate coupled to clock $clk_2$. The drain of P-type transistor 401 is coupled to the supply voltage Vcc, and its source is coupled to the drain of N-type transistor 403, whose gate is coupled to input signal $p_{xi}$. The source of P-type transistor 401 is also coupled to line 410 over which is generated the $p'_{yi}$ term. The source of N-type transistor 403 is coupled to the drain of N-type transistor 405, having a gate coupled to $p_{xi-2}$ and a source coupled to Vss.

Figure 17:
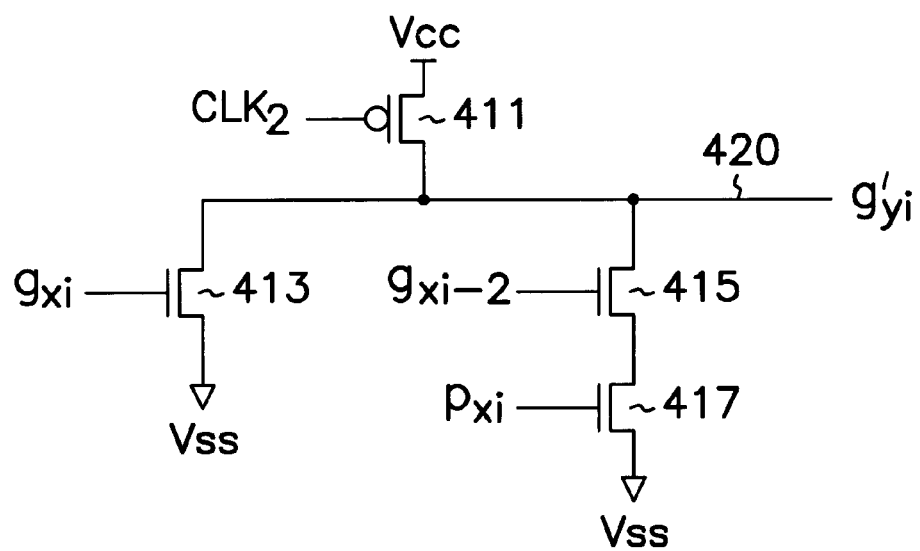
FIG. 17 illustrates a circuit diagram for generating a $g'_{yi}$ term in one embodiment of the invention.

FIG. 17 illustrates a circuit diagram for generating a $g'_{yi}$ term in one embodiment of the invention. The circuit comprises P-type transistor 411, having a gate coupled to $clk_2$ and a source coupled to line 420, over which term $g'_{yi}$ is output. The drains of N-type transistors 413 and 415 are coupled to line 420, and their gates are respectively coupled to $g_{xi}$ and $g_{xi-2}$. The source of N-type transistor 413 is coupled to Vss. The source of N-type transistor 415 is coupled to the drain of N-type transistor 417, whose gate is coupled to $p_{xi}$, and whose source is coupled to Vss.

Figure 18:
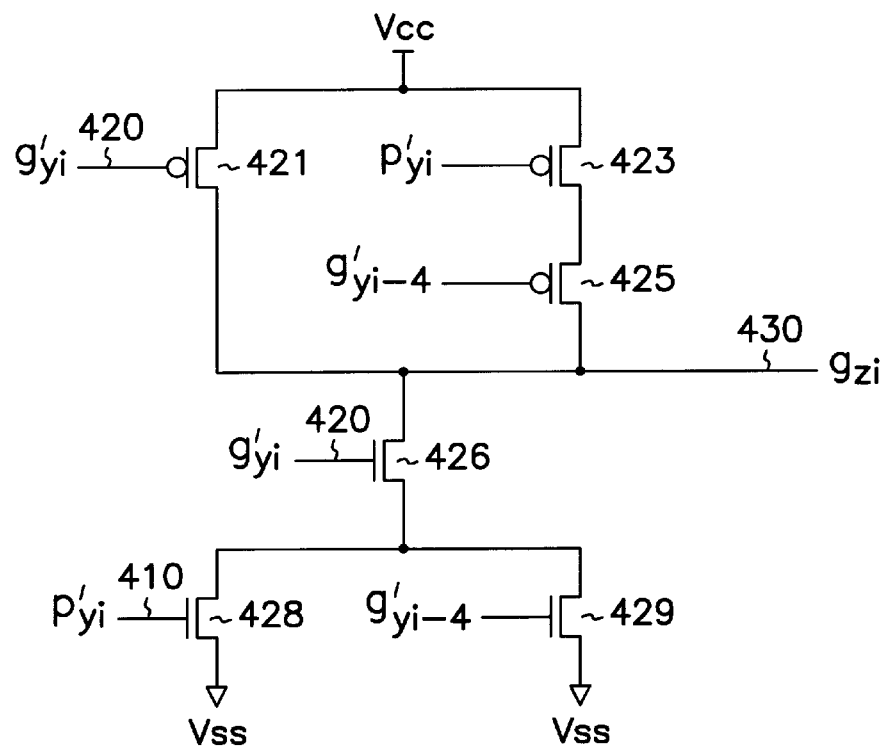
FIG. 18 illustrates a circuit diagram for generating a $g_{zi}$ term in one embodiment of the invention.

FIG. 18 illustrates a circuit diagram for generating a $g_{zi}$ term in one embodiment of the invention. The circuit comprises P-type transistors 421 and 423 whose drains are coupled to Vcc. The gates of P-type transistors 421 and 423 are coupled to $g'_{yi}$ and $p'_{yi}$, respectively. The source of P-type transistor 421 is coupled to line 430 and to the drain of N-type transistor 426, whose gate is coupled to $g'_{yi}$, and whose source is coupled to the drains of N-type transistors 428 and 429. The source of P-type transistor 423 is coupled to the drain of P-type transistor 425, whose gate is coupled to $g'_{yi-4}$, and whose source is coupled to line 430. Line 430 outputs the $g'_{zi}$ term. The gates of N-type transistors 428 and 429 are coupled to $p'_{yi}$ and $g'_{yi-4}$, respectively, and their sources are coupled to Vss.

Figure 19:
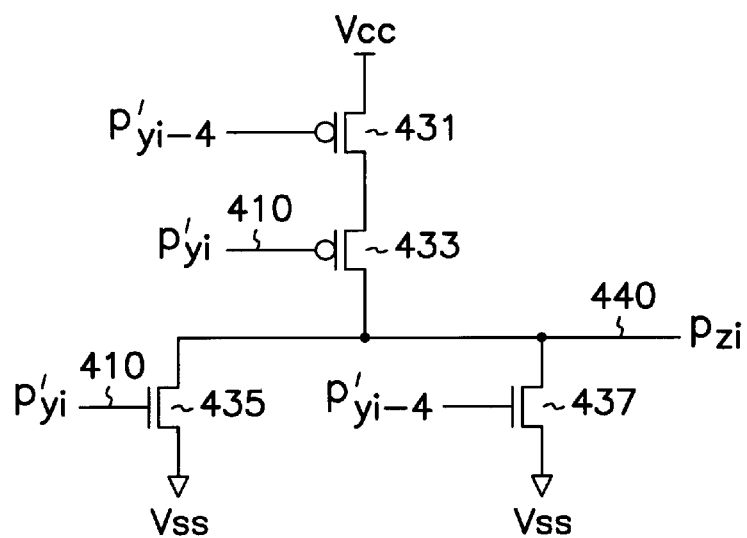
FIG. 19 illustrates a circuit diagram for generating a $p_{zi}$ term in one embodiment of the invention.

FIG. 19 illustrates a circuit diagram for generating a $p_{zi}$ term in one embodiment of the invention. The circuit comprises a P-type transistor 431, having a gate coupled to $p'_{yi-4}$ and a source coupled to the drain of P-type transistor 433. The gate of P-type transistor 433 is coupled to $p'_{yi}$, and its source is coupled to line 440, over which the $p_{zi}$ term is output. Also coupled to line 440 are the drains of N-type transistors 435 and 437, whose gates are respectively coupled to $p'_{yi}$ and $p'_{yi-4}$, and whose sources are coupled to Vss.

Figure 20:
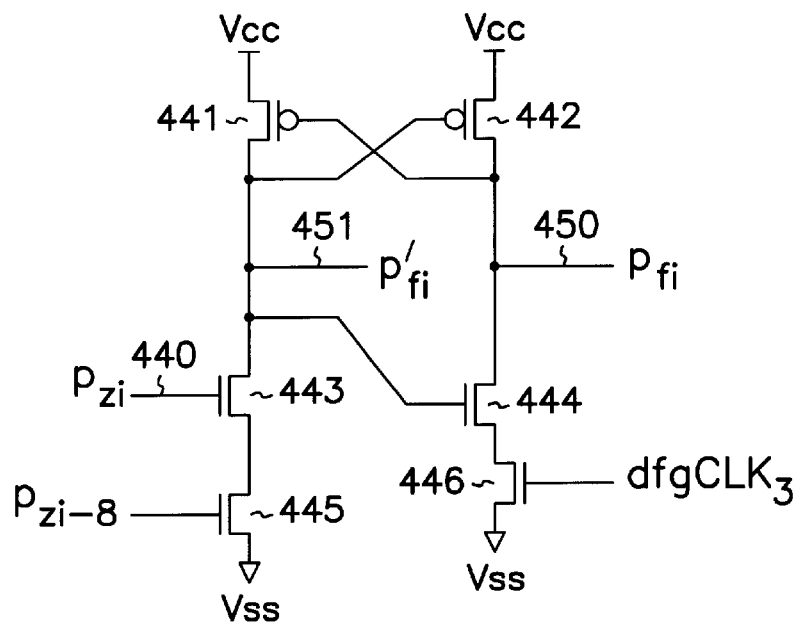
FIG. 20 illustrates a circuit diagram for generating $p_{fi}$ and $p'_{fi}$ terms in one embodiment of the invention.

FIG. 20 illustrates a circuit diagram for generating $p_{fi}$ and $p'_{fi}$ terms in one embodiment of the invention. The circuit is similar to circuit 100 of FIG. 9, except that the gate of N-type transistor 443 is coupled to $p_{zi}$ rather than to $g'_{xi}$, and the source of N-type transistor 443 is coupled to the drain of an additional N-type transistor 445, whose gate is coupled to $p_{zi-8}$, and whose source is coupled to Vss. Also, the gate of N-type transistor 446 is coupled to $dfgclk_3$ rather than $dfgclk_2$. Output line 450 outputs term $p_{fi}$, and term $p'_{fi}$ is generated at the drain of N-type transistor 443.

Figure 21:
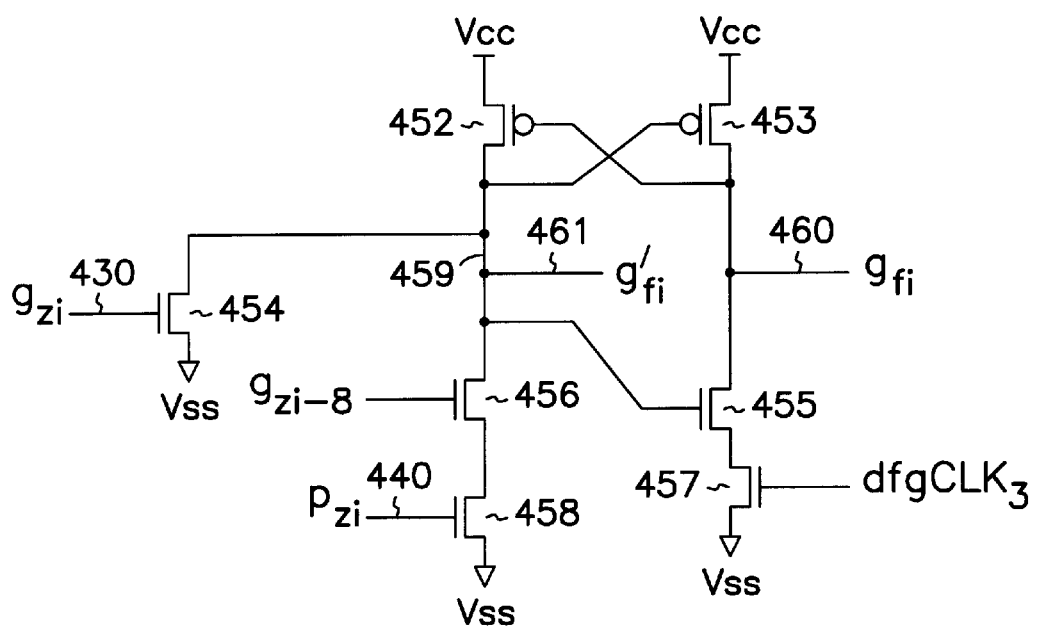
FIG. 21 illustrates a circuit diagram for generating $g_{fi}$ and $g'_{fi}$ terms in one embodiment of the invention.

FIG. 21 illustrates a circuit diagram for generating $g_{fi}$ and $g'_{fi}$ terms in one embodiment of the invention. The circuit resembles circuit 1002 of FIG. 9 but will be described in detail. The drains of a pair of P-type transistors 452 and 453 are coupled to Vcc, and their gates are cross-coupled to their respective sources. The source of P-type transistor 453 is coupled to line 460 over which the term $g_{fi}$ is output.

The source of P-type transistor 452 is coupled to node 459. Also coupled to node 459 is the drain of N-type transistor 454, whose gate is coupled to $g_{zi}$, and whose source is coupled to Vss. Also coupled to node 459 are the drain of N-type transistor 456, an output line 461 over which the term $g'_{fi}$ is output, and the gate of N-type transistor 455. N-type transistor 456 has a gate coupled to $g_{zi-8}$ and a source coupled to the drain of N-type transistor 458, whose gate is coupled to $p_{zi}$, and whose source is coupled to Vss. N-type transistor 455 has a source coupled to the drain of N-type transistor 457, whose gate is coupled to $dfgclk_3$, and whose source is coupled to Vss.

FIG. 22 illustrates a circuit diagram for generating a $c'_i$ term in one embodiment of the invention. The circuit is similar to that of FIG. 7, except that one P-type transistor 462 has its gate coupled to $p_{fi}$, and the other P-type transistor 463 has its gate coupled to $g_{fi-6}$. The N-type transistor 464 whose drain is coupled to the sources of P-type transistors 462 and 463 has a gate coupled to $g_{fi}$, and its source is coupled to line 470 over which the $c'_i$ term is output. The N-type transistors 466 and 467 whose drains are coupled to output line 470 have gates coupled to $g_{fi}$ and $p_{fi}$, respectively. The N-type transistor 468 whose drain is coupled to the source of N-type transistor 467 has a gate coupled to $g_{fi-6}$.

Figure 23:
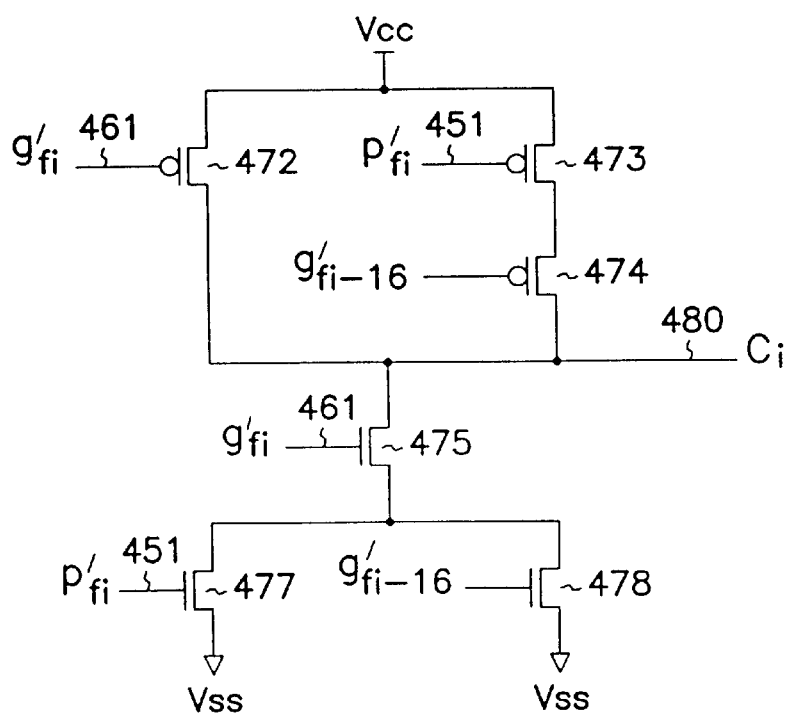
FIG. 23 illustrates a circuit diagram for generating a $c_i$ term in one embodiment of the invention.

FIG. 23 illustrates a circuit diagram for generating a $c_i$ term in one embodiment of the invention. The circuit is similar to that of FIG. 18, except that "f" is substituted for "y" in the subscripts of the "p" and "g" terms, and $g''f_{fi-16}$ is applied to the gates of P-type transistor 474 and P-type transistor 478. The $c_i$ term is output over line 480 which is coupled to the drain of the uppermost N-type transistor in the combinatorial logic, N-type transistor 475.

The logic expressions implemented at each stage are given as follows:

Stage 1

$$g_{xi}=(g_i+p_ig_{i-1}) \qquad \text{(Equation 25)}$$

$$p_{xi}=(p_ip_{i-1}) \qquad \text{(Equation 26)}$$

The $g_{xi}$ and $p_{xi}$ terms are generated by circuits which are nearly identical to those shown in FIGS. 5–8.

Stage 2

$$g'_{yi}=(g_{xi}+p_{xi}g_{xi-2})' \qquad \text{(Equation 27)}$$

$$p'_{yi}=(p_{xi}p_{xi-2})' \qquad \text{(Equation 28)}$$

$$g_{zi}=(g'_{ui}(p'_{yi}+g'_{yi-4}))' \qquad \text{(Equation 29)}$$

$$p_{zi}=(p'_{yi}+p'_{yi-4})' \qquad \text{(Equation 30)}$$

Stage 3

$$g'_{fi}=(g_{zi}+p_{zi}g_{zi-8})' \qquad \text{(Equation 31)}$$

$$p'_{fi}(p_{zi}p_{zi-8})' \qquad \text{(Equation 32)}$$

$$c_i = (g'_{fi}(p'_{fi} + g'_{fi-16}))' \quad \text{(Equation 33)}$$

$$c'_i = (g_{fi} + p_{fi}g_{fi-16})' \quad \text{(Equation 34)}$$

Stage 4

$$SUM_i = a_i \oplus b_i \oplus c_{i-1} \quad \text{(Equation 35)}$$

$$SUM'_i = a_i \overline{\oplus} b_i \overline{\oplus} c_{i-1} \quad \text{(Equation 36)}$$

The $SUM_i$ and $SUM'_i$ terms are generated by a circuit identical to that shown in FIG. 11.

Figure 24:
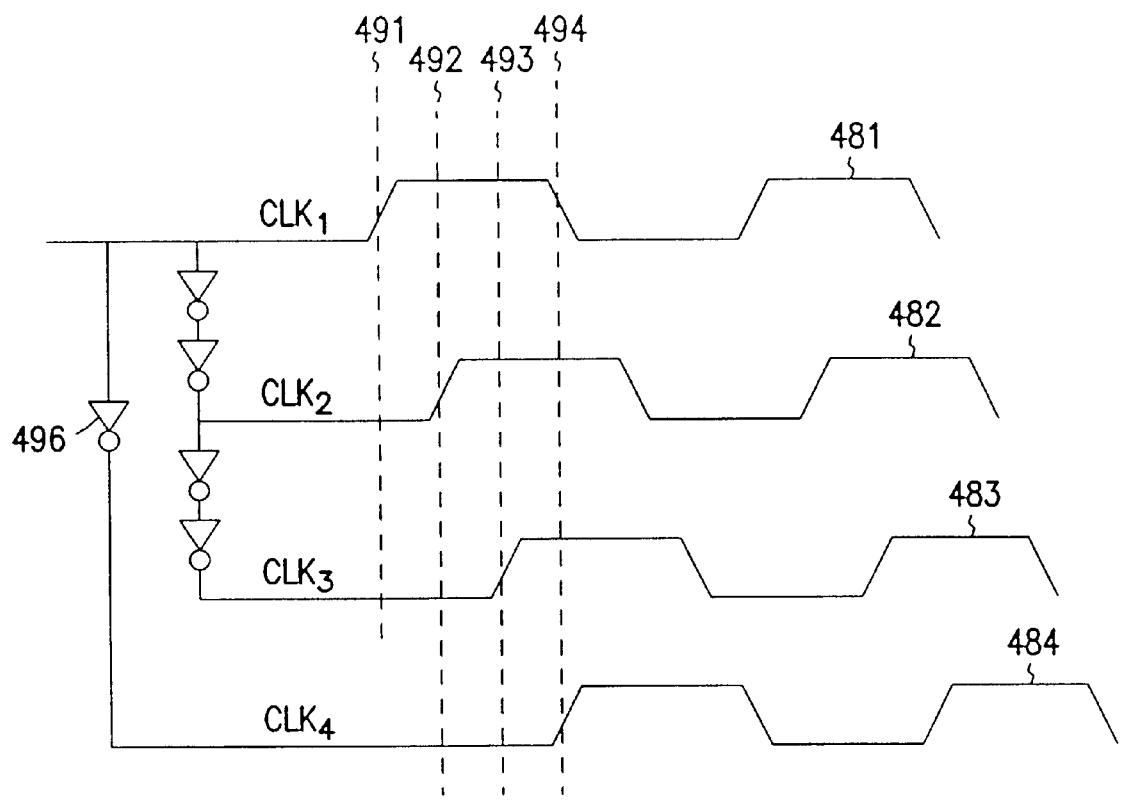
FIG. 24 illustrates a timing diagram showing the relationship between clock signals $clk_1$, $clk_2$, $clk_3$, and $clk_4$ in one embodiment of the invention.

FIG. 24 illustrates a timing diagram showing the relationship between clock signals $clk_1$, $clk_2$, $clk_3$, and $clk_4$ in one embodiment of the invention. Clock signal $clk_1$, represented by trace 481, can be generated by any suitable circuit in a well known manner. Clock signals $clk_2$, $clk_3$, and $clk_4$, represented by respective traces 482–484, can likewise be generated in a well known manner from clock signal $clk_1$, for example by utilizing appropriate inverters such as inverter 496 to produce the desired phase relationship.

In one embodiment, each of clock signals $clk_1$ through $clk_4$ has a 50% duty cycle, and the rise times of clock signals $clk_2$–$clk_4$ occur after an identical time period from that of their predecessors, $clk_1$–$clk_3$, respectively. Clock signals $clk_1$ through $clk_4$ are said to be "wave-pipelined".

Figure 25:
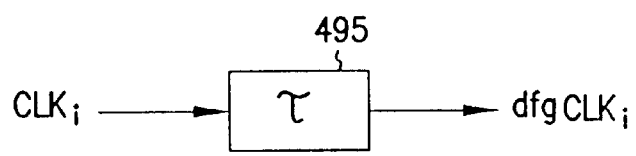
FIG. 25 illustrates a schematic diagram for generating a dual-function generator clock signal $dfgclk_u$ from a $clk_i$ signal.

FIG. 25 illustrates a schematic diagram for generating a dual-function generator clock signal $dfgclk_i$ from a $clk_i$ signal. Various dual-function generator ("dfg") clock signals dfgclki are shown in the circuit diagrams. These are generated by suitably delaying slightly, e.g. by 10%–20%, the corresponding with clock signal. For example, $dfgclk_2$ is generated by delaying $clk_2$ by approximately 10%–20%. The clock signal delay can be implemented by any suitable means well known to those of ordinary skill in the art. The amount of delay can be adjusted as necessary to meet the particular circuit requirements and can be outside the range of 10%–20%.

Figure 26:
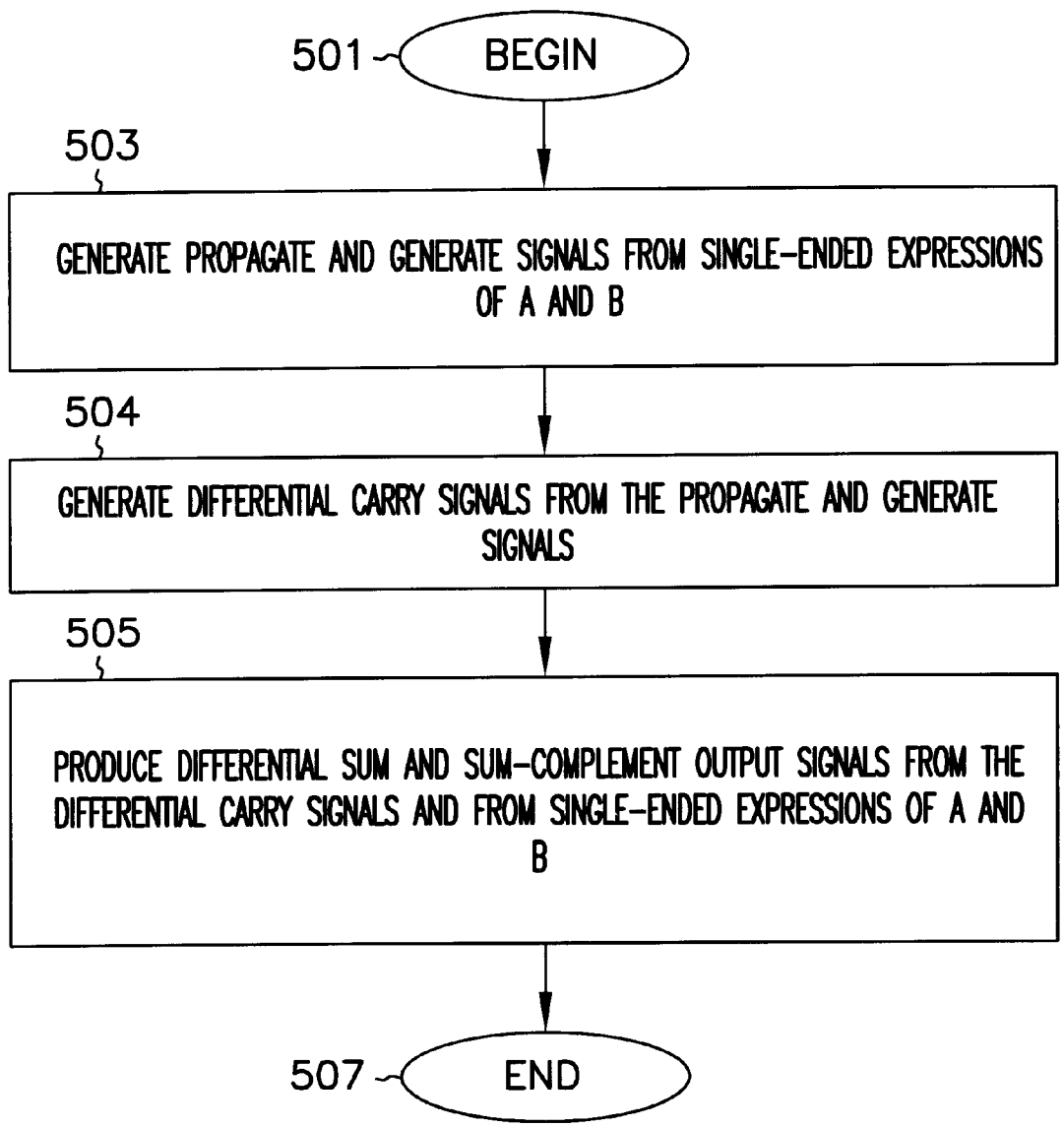
FIG. 26 illustrates a flow diagram of a method for adding numbers in accordance with one embodiment of the present invention.

FIG. 26 illustrates a flow diagram of a method for adding two numbers in accordance with one embodiment of the present invention. It will be appreciated by one of ordinary skill in the art that the method operations described in FIG. 26 are those that relate to the embodiments shown and described above. Other methods having different operations and variations in the sequence of operations will be known by one of ordinary skill in the art in view of the disclosure herein.

First, the process begins in box 501. In box 503 propagate and generate signals are generated from "single-ended" expressions of the two addends A and B, as that term is defined earlier in the description.

In box 504, differential carry signals are generated from the propagate and generate signals.

In box 505, differential sum and sum-complement output signals are produced from the differential carry signals and from the single-ended expressions of the addends A and B.

The method ends in box 507.

It will be understood by those skilled in the art that the operations of the method could be carried out in a different order from that shown in FIG. 26.

CONCLUSION

In conclusion, embodiments of the present invention provide a low-noise adder circuit which utilizes a fast, low-power domino circuit that is less complex and more efficient in terms of the amount of circuit wiring and area consumed.

In addition, embodiments of the present invention provide a microprocessor, as well as a digital computer incorporating a microprocessor, which utilize an adder circuit that operates at very high speed and consumes relatively little power.

The adder circuit delivers true and complementary outputs from single-ended primary inputs, thereby eliminating half of the interconnection and logic compared to a dual-rail domino implementation. This results in significant area and energy savings.

The adder circuit can be implemented with only 50% duty cycle clocks, in a simple overlapped wave-pipelining timing plan. No pulsed clocks, which typically make the design complicated, need be used. Further, pulse clock generators often do not scale well with technology. This disadvantage is overcome by using 50% duty cycle clock generators.

The widest or maximum fan-in in the domino circuits is no greater than two. This enables the use of all low VT devices, offering substantial performance gains while maintaining high noise tolerance. Further, input pattern dependent delay variations are minimal, contributing to lesser worst-case margining.

The embodiments of adder circuits described herein do not use ratioed NOR gates in the static stages. The static stages are fully static CMOS, and they therefore do not present a direct-current offset to the inputs of the fan-out domino gates. This further enhances noise tolerance compared to ratioed NOR-based, dual-rail domino circuits.

The present disclosure may be embodied in other specific forms without departing from the spirit or essential characteristics thereof. The present embodiments are therefore to be considered in all respects as illustrative and not restrictive, the scope of embodiments of the invention being indicated by the appended claims rather than by the foregoing description, and all changes which come within the meaning and range of equivalency of the claims are therefore intended to be embraced therein.

What is claimed is:

1. An adder circuit comprising:
   at least one single-ended domino circuit having at least one dual-function generator circuit to generate differential sum and sum-complement output signals.

2. An adder circuit as recited in claim 1 wherein the adder circuit does not comprise differential circuitry.

3. An adder circuit as recited in claim 1 wherein the adder circuit is to generate the differential sum and sum-complement output signals from single-ended addend inputs but does not comprise differential circuitry.

4. An adder circuit as recited in claim 1 and having a maximum fan-in that is no greater than two.

5. An adder circuit as recited in claim 1 wherein the at least one single-ended domino circuit comprises a first logic circuit to generate differential carry output signals from single-ended addend inputs.

6. An adder circuit as recited in claim 5 wherein the first logic circuit comprises a plurality of dual-function generator circuits.

7. An adder circuit as recited in claim 5 wherein the at least one single-ended domino circuit further comprises a second logic circuit to generate the differential sum and sum-complement output signals from the single-ended addend inputs and the differential carry output signals.

8. An adder circuit as recited in claim 7 wherein the second logic circuit comprises:
   a pair of transmission gates, each having an input coupled to a different one of the differential carry output signals, each transmission gate having a pair of control terminals coupled to first and second logical combinations, respectively, of the single-ended addend inputs, and each transmission gate further having an output to generate either a differential sum output signal or a differential sum-complement output signal.

9. An adder circuit as recited in claim 8 wherein the first logical combination of the single-ended addend inputs is an Exclusive-OR.

10. An adder circuit as recited in claim 8 wherein the second logical combination of the single-ended addend inputs is an Exclusive-NOR.

11. An adder circuit as recited in claim 1 wherein the at least one single-ended domino circuit includes:
 a propagate/generate merge circuit to generate propagate and generate signals from single-ended addend inputs;
 a carry generator circuit to generate differential carry output signals from the propagate and generate signals; and
 a sum generator circuit to generate the differential sum and sum-complement output signals from the single-ended addend inputs and the differential carry output signals.

12. An adder circuit as recited in claim 11 wherein the propagate/generate merge circuit comprises a plurality of dual-function generator circuits.

13. An adder circuit as recited in claim 1 and further comprising a clock circuit which generates at least one clock signal having approximately a 50% duty cycle.

14. An adder comprising:
 a first circuit coupled to receive A and B signals, each of the A and B signals comprising a plurality of bits, the first circuit to logically combine the A and B signals to provide propagate and generate signals;
 a second circuit to logically combine the propagate and generate signals and to output at least one bit-carry signal and a sum-carry signal;
 a third circuit to logically combine the A and B signals, the at least one bit-carry signal, and the sum-carry signal to provide a sum signal; and
 at least one of the circuits comprising a single-ended domino circuit having a dual-function generator circuit to generate differential sum and sum-complement output signals.

15. A Kogge-Stone adder comprising:
 a first circuit coupled to receive A and B signals, each of the A and B signals comprising a plurality of bits, the first circuit to logically combine the A and B signals to provide first propagate and generate signals;
 a second circuit comprising a plurality of levels, a first level to logically combine the first propagate and generate signals and to output intermediate propagate and generate signals and at least one bit-carry signal, and each successive level of the plurality of levels being responsive to intermediate propagate and generate signals and to the at least one bit-carry signal that is output by a preceding level and to logically combine such intermediate propagate and generate signals and the at least one bit-carry signal into further intermediate propagate and generate signals and at least one additional bit-carry signal, and a last level to output at least one bit-carry signal and a sum-carry signal;
 a third circuit to logically combine the A and B signals with the at least one bit-carry signal and the sum-carry signal output by the second circuit to provide a sum signal; and
 at least one of the circuits comprising a single-ended domino circuit having a dual-function generator circuit to generate differential sum and sum-complement output signals.

16. A processor comprising an arithmetic logic unit, the arithmetic logic unit including an adder circuit comprising:
 at least one single-ended domino circuit having at least one dual-function generator circuit to generate differential sum and sum-complement output signals.

17. An integrated circuit comprising:
 at least one single-ended domino circuit having at least one dual-function generator circuit to generate differential sum and sum-complement output signals.

18. The integrated circuit recited in claim 17 wherein the integrated circuit comprises a processor that includes the at least one single-ended domino circuit.

19. The integrated circuit recited in claim 18 wherein the processor comprises an arithmetic logic unit including an adder circuit.

20. The integrated circuit recited in claim 17 wherein the integrated circuit comprises a microcontroller that includes the at least one single-ended domino circuit.

21. The integrated circuit recited in claim 17 wherein the integrated circuit comprises a digital signal processor that includes the at least one single-ended domino circuit.

22. The integrated circuit recited in claim 17 wherein the integrated circuit comprises a communications circuit that includes the at least one single-ended domino circuit.

23. The integrated circuit recited in claim 17 wherein the integrated circuit comprises an application-specific circuit that includes the at least one single-ended domino circuit.

24. A data processing system comprising:
 a bus coupling components in the data processing system;
 a display coupled to the bus;
 external memory coupled to the bus; and
 a microprocessor coupled to the bus and comprising an arithmetic logic unit, the arithmetic logic unit including an adder circuit comprising at least one single-ended domino circuit having at least one dual-function generator circuit to generate differential sum and sum-complement outputn signals from single-ended signals input thereto.

25. A method of adding two numbers, A and B, each having a plurality of bits, comprising:
 generating propagate and generate signals only from an A, B pair from the group consisting of A and B, A' and B, A and B', or A' and B';
 generating differential carry signals from the propagate and generate signals; and
 producing differential sum and sum-complement output signals from the differential carry signals, and from the A, B pair.

26. The method recited in claim 25 wherein generating is carried out by one or more dual-function generator circuits.

27. The method recited in claim 26 wherein, in generating, the one or more dual-function generator circuits comprise a single-rail domino circuit.

28. The method recited in claim 25 wherein producing is carried out by one or more transmission gates.

* * * * *

UNITED STATES PATENT AND TRADEMARK OFFICE
CERTIFICATE OF CORRECTION

PATENT NO. : 6,571,269 B1   Page 1 of 1
DATED : May 27, 2003
INVENTOR(S) : Jay R. Anderson and Ram K. Krishnamurthy It is certified that error appears in the above-identified patent and that said Letters Patent is hereby corrected as shown below:

Column 16,
Line 44, delete "outputn" and insert -- output -- therefor.

Signed and Sealed this

Twenty-seventh Day of July, 2004

JON W. DUDAS
*Acting Director of the United States Patent and Trademark Office*